US006987675B2

(12) United States Patent  
Jovanovic et al.

(10) Patent No.: US 6,987,675 B2  
(45) Date of Patent: Jan. 17, 2006

(54) SOFT-SWITCHED POWER CONVERTERS

(75) Inventors: Milan M. Jovanovic, Cary, NC (US); Yungtaek Jang, Apex, NC (US); Yu-ming Chang, Taoyuan (TW); Kung-Hui Fang, Taoyuan (TW)

(73) Assignee: Delta Electronics, Inc., Taipei (TW)

( * ) Notice: Subject to any disclaimer, the term of this patent is extended or adjusted under 35 U.S.C. 154(b) by 381 days.

(21) Appl. No.: 10/445,111

(22) Filed: May 23, 2003

(65) Prior Publication Data

US 2005/0226012 A1 Oct. 13, 2005

(51) Int. Cl.  
*H02M 3/335* (2006.01)

(52) U.S. Cl. .................. 363/21.01; 363/56.01

(58) Field of Classification Search .............. 363/16, 363/20, 21.01, 56.01, 131  
See application file for complete search history.

(56) References Cited

U.S. PATENT DOCUMENTS

| 6,051,961 A * | 4/2000 | Jang et al. ............ 323/224 |
| 6,246,599 B1 * | 6/2001 | Jang et al. ............ 363/132 |
| 6,906,930 B2 * | 6/2005 | Jang et al. ............ 363/17 |

FOREIGN PATENT DOCUMENTS

DE 102004022136 A1 * 12/2004

* cited by examiner

*Primary Examiner*—Adolf Berhane  
(74) *Attorney, Agent, or Firm*—Edward C. Kwok; MacPherson Kwok Chen & Heid LLP

(57) ABSTRACT

A soft-switched boost converter includes an active snubber to provide soft switching of all semiconductor components. Specifically, the current ("turn-off current") in the rectifier is switched off at a controlled rate, the main switch is closed under zero-voltage switching (ZVS) condition, and the auxiliary switch in the active snubber is opened under zero-current switching (ZCS) condition. As a result, switching losses are reduced with beneficial effects on conversion efficiency and EMC performance.

52 Claims, 26 Drawing Sheets

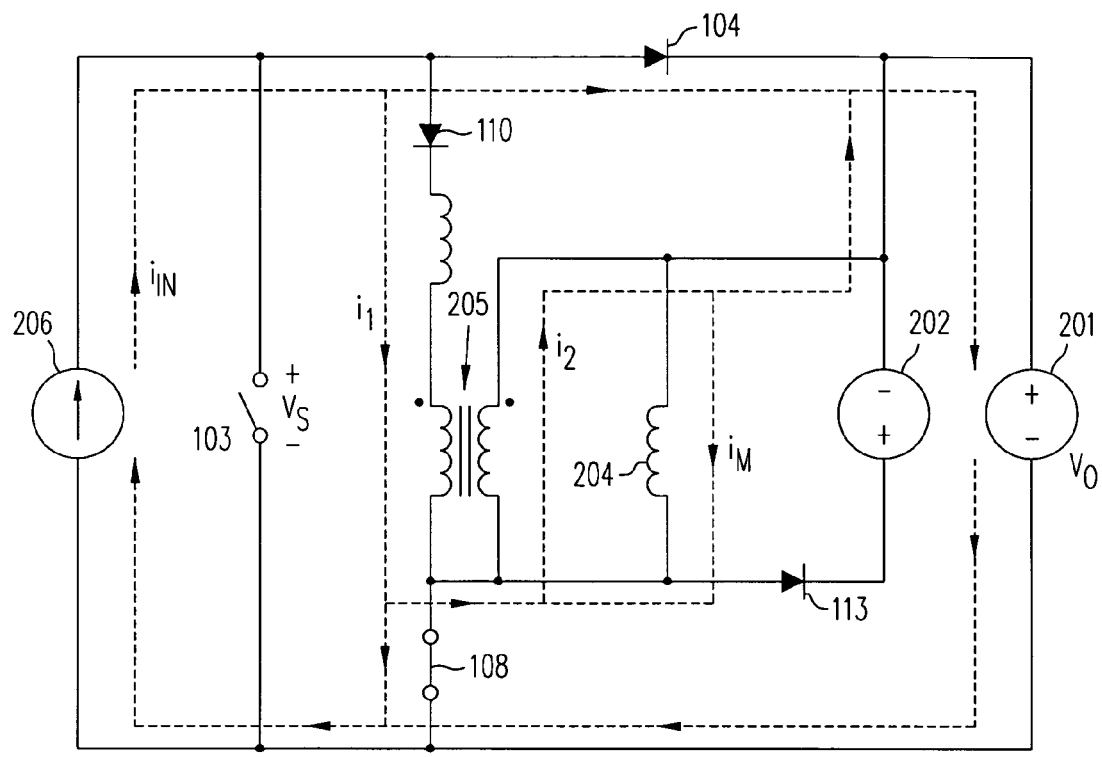
[T₀–T₁] *FIG. 3a*
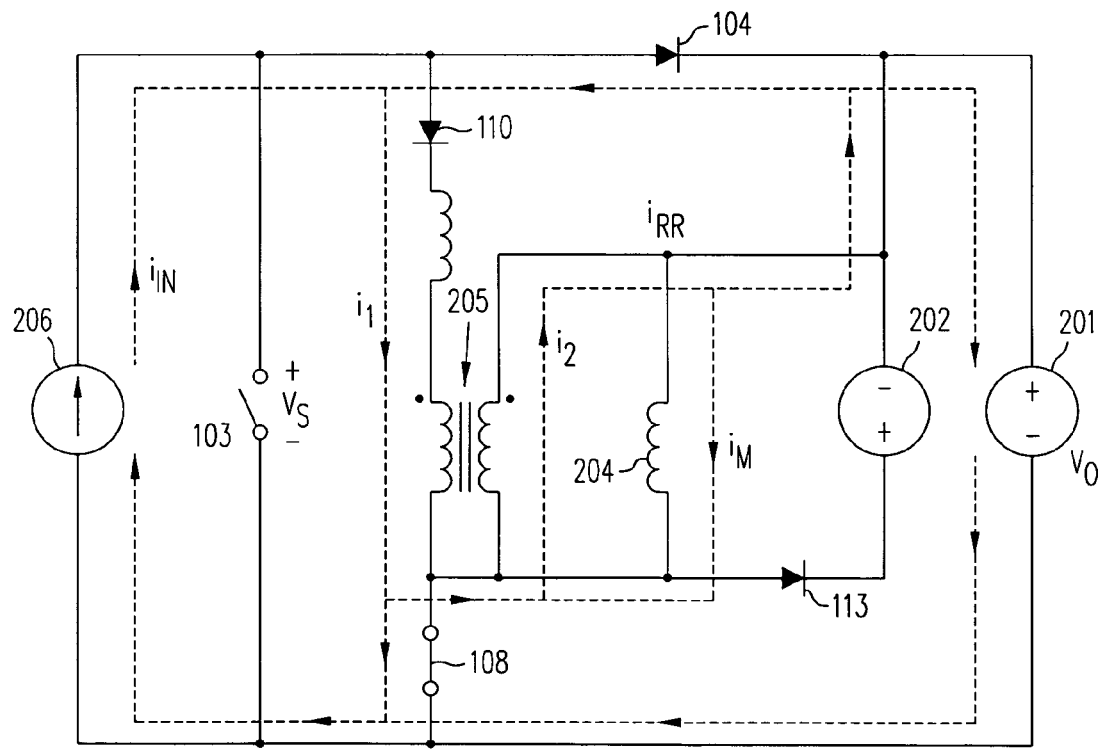
[T₁–T₂] *FIG. 3b*

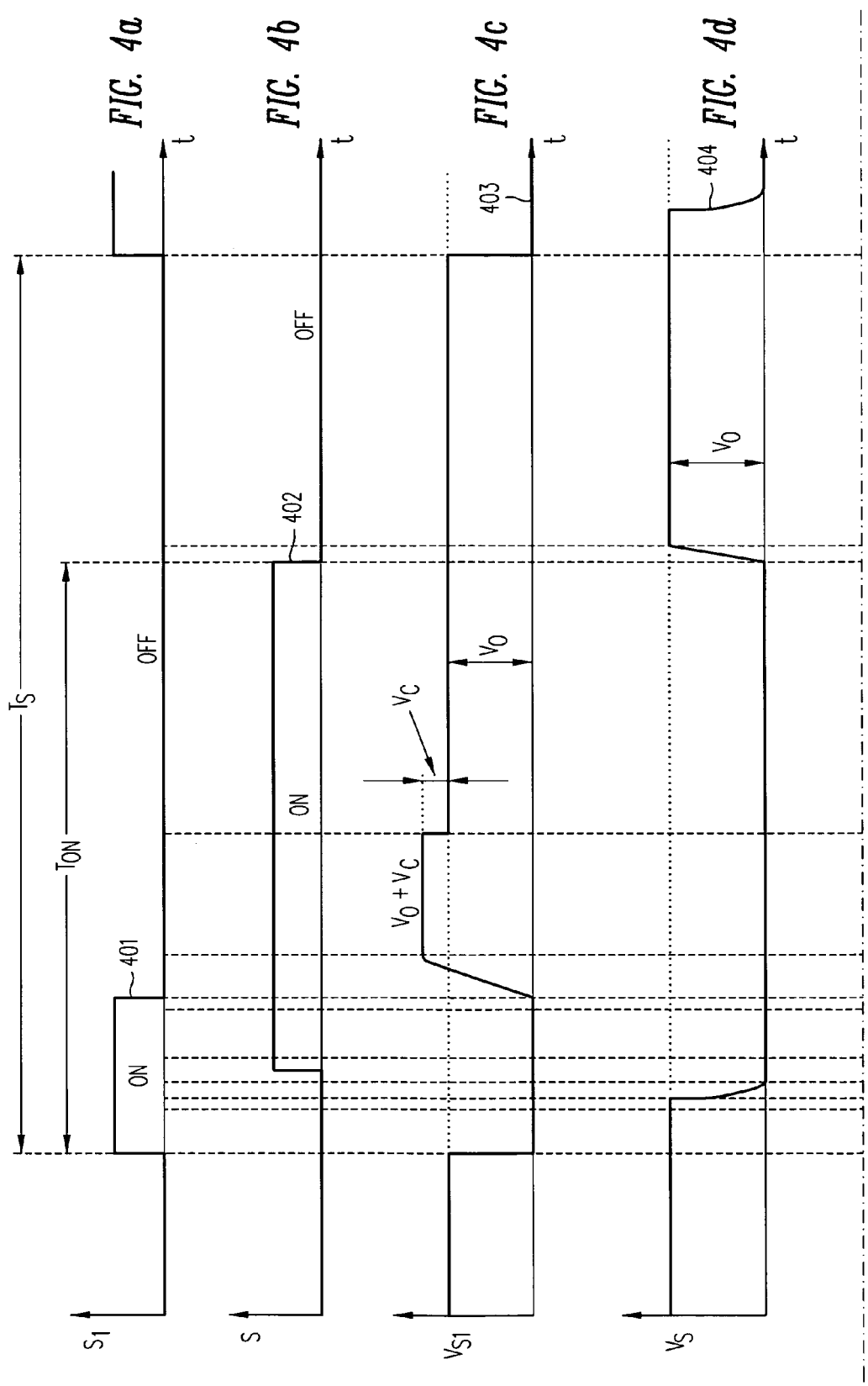

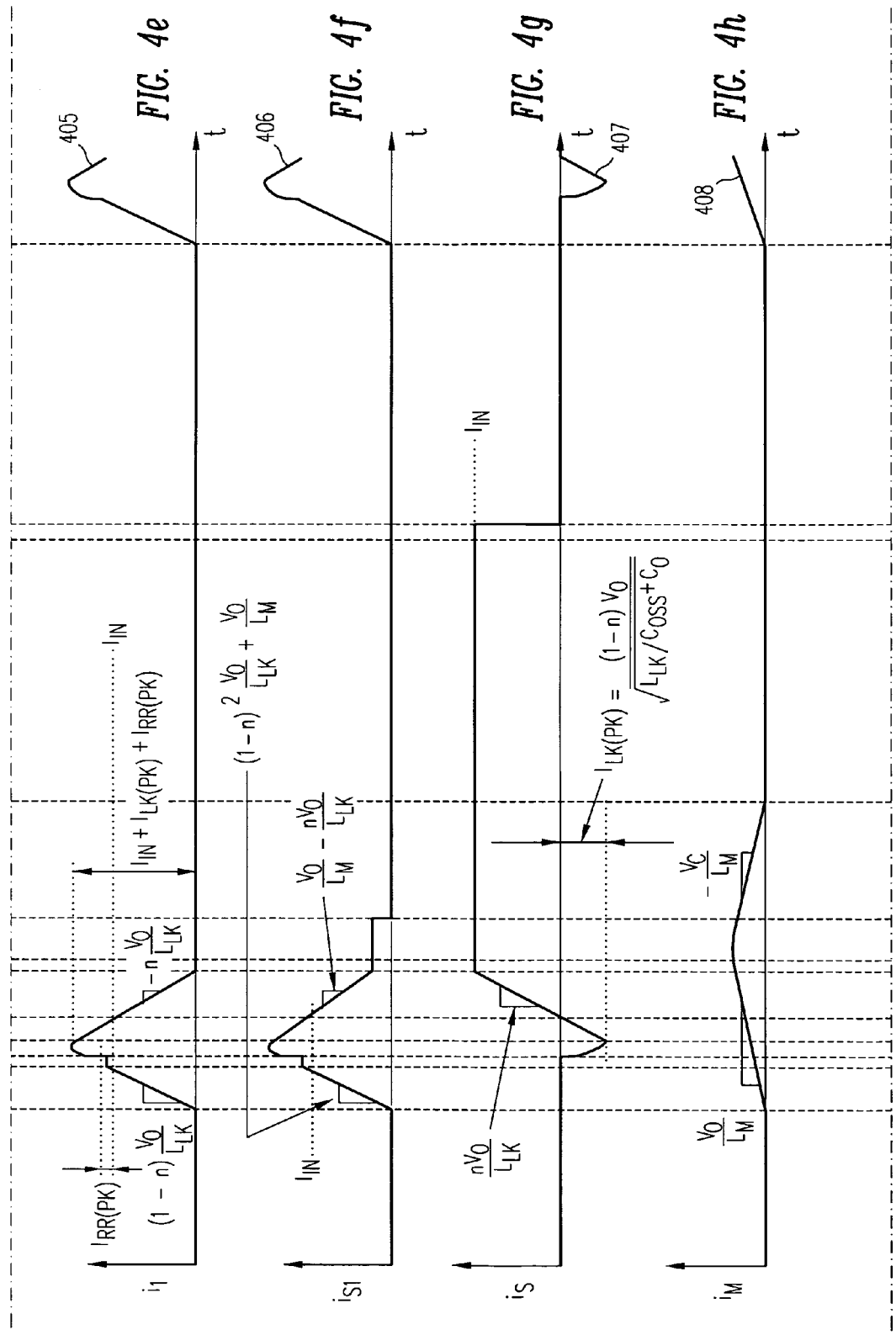

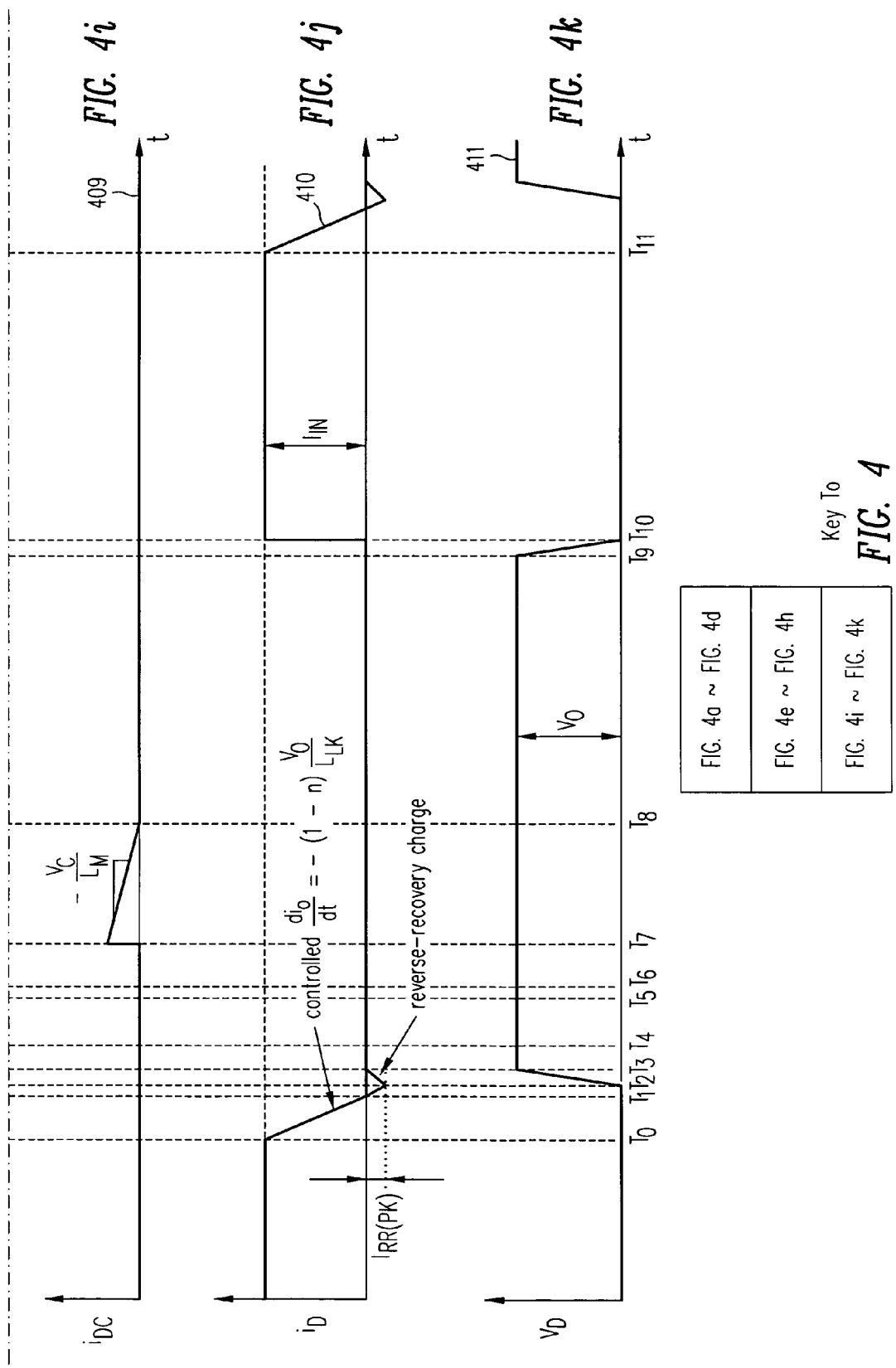

SOFT-SWITCHED POWER CONVERTERS

BACKGROUND OF THE INVENTION

1. Field of the Invention

This invention relates to DC/DC and AC/DC power converters. More particularly, this invention relates to DC/DC and AC/DC power converters with soft switching in all of their semiconductor components.

2. Discussion of the Related Art

The boost converter topology has been extensively used in various AC/DC and DC/DC converter applications. In fact, the boost technology is used today in most front ends of DC/DC power supplies having power-factor correction (PFC). The boost topology is also used in numerous applications in which a battery-powered low input voltage is used to generate a high output voltage. At higher power levels, the continuous conduction mode (CCM) boost converter is the preferred topology for a front end with PFC. Thus, in recent years, significant efforts have been made to improve the performance of high-power boost converters. These development efforts have focused on reducing adverse reverse-recovery characteristics that affect the conversion efficiency and the electromagnetic compatibility (EMC) of the boost rectifier.

Generally, reverse-recovery-related losses and EMC problems are minimized by "softly" switching off the boost converter at a controlled turn-off current rate. Many soft-switched boost converters have been proposed that use additional components to form a snubber circuit (passive or active) to control the rate of change of the turn-off current in the boost rectifier. In a passive snubber circuit, only passive components such as resistors, capacitors, inductors, and rectifiers are used. In an active snubber circuit, in addition to the passive elements, one or more active switches are used. Although a passive lossless snubber can improve efficiency, its performance is inadequate to make it useful in high-performance PFC circuit applications. Generally, a passive lossless snubber circuit suffers from increased component stresses and is difficult to operate with soft-switching of the boost switch, which is detrimental in high-density applications that require increased switching frequencies.

Some active snubbers can provide simultaneous reverse-recovery loss reduction and boost switch soft-switching. However, most of these active snubbers offer soft turn-off in the boost rectifier, zero-voltage switching (ZVS) in the boost switch, and "hard" switching in the active-snubber switch. Active-snubbers that implement soft-switching of all semiconductor components (e.g., soft turn-off in the boost rectifier, ZVS in the boost switch, and zero-current switching (ZCS) in the active-snubber switch) are desired.

SUMMARY OF THE INVENTION

According to the present invention, a new soft-switched boost converter includes an active snubber to provide soft switching of all semiconductor components. Specifically, the current ("turn-off current") in the rectifier is switched off at a controlled rate, the switch is closed under zero-voltage switching (ZVS) condition, and the auxiliary switch in the active snubber is opened under zero-current switching (ZCS) condition. As a result, switching losses are reduced with beneficial effects on conversion efficiency and EMC performance.

In one embodiment, a circuit according to this invention may include an active snubber having a two-winding transformer, an auxiliary switch, a blocking diode, and a voltage-clamp circuit that is used to reset the magnetizing energy of the transformer. According to another embodiment of the present invention, the active snubber circuit includes a three-winding transformer that generates an isolated auxiliary power supply, in addition to providing soft-switching of all semiconductor devices.

In one embodiment, the power converter includes a storage inductor coupled to an input terminal of the power converter, a first switch operating to charge and discharge the storage inductor, an active snubber including a second switch, a rectifier operatively coupled to the storage inductor, the active snubber and the output terminal to transfer energy from the storage inductor to the output terminal; and a control circuit. The control circuit operates the first and second switches over a switching cycle, such that the second switch closes to cause a current in the rectifier to be diverted from the rectifier to the active snubber, so as to allow the first switch to close at a substantially zero voltage condition and, in turn, to allow the second switch to open at substantially zero current condition. The active snubber can be referenced to any stable DC voltage in the power converter, such as the voltage at the output terminal, the voltage at the input terminal, the voltage at a terminal of the storage inductor, or the negative rail of the power source.

In one implementation, the active snubber includes a voltage clamp circuit, which includes a transformer, a capacitor, and a resistor. The transformer may have a turns ratio between a primary winding and a secondary winding of less than 0.5. Where the leakage inductance of the transformer is not large enough to provide a desirable turn-off current in the rectifier, an external snubber inductor of a predetermimed inductance can be coupled between the storage inductor and the voltage clamp circuit. The active snubber can also be provide one or more isolated power supplies, that can regulated independently of the voltage at the output terminal.

The present invention is applicable to numerous converter configurations, such as the boost converter, the forward converter, the buck converter or the buck/boost converter configuration. Further, the present invention is applicable to both DC and AC power sources. In one embodiment, where the invention is applied to power conversion of an AC power source, the first switch and the rectifier are provided as parts of a full-wave rectifier. The present invention is also applicable to both single-phase and three-phase power sources.

The present invention is better understood upon consideration of the detailed description below and the accompanying drawings.

BRIEF DESCRIPTION OF THE DRAWINGS

FIGS. 3(a)–(k) are topological stages of circuit model 200 of FIG. 2 during a switching cycle.

FIGS. 4(a)–4(k) show the key waveforms of circuit model 200 during the switching cycle of FIGS. 3(a)–3(k).

To facilitate cross referencing among the figures, like objects in the figures are assigned like reference numerals.

DETAILED DESCRIPTION OF THE INVENTION

Figure 1:
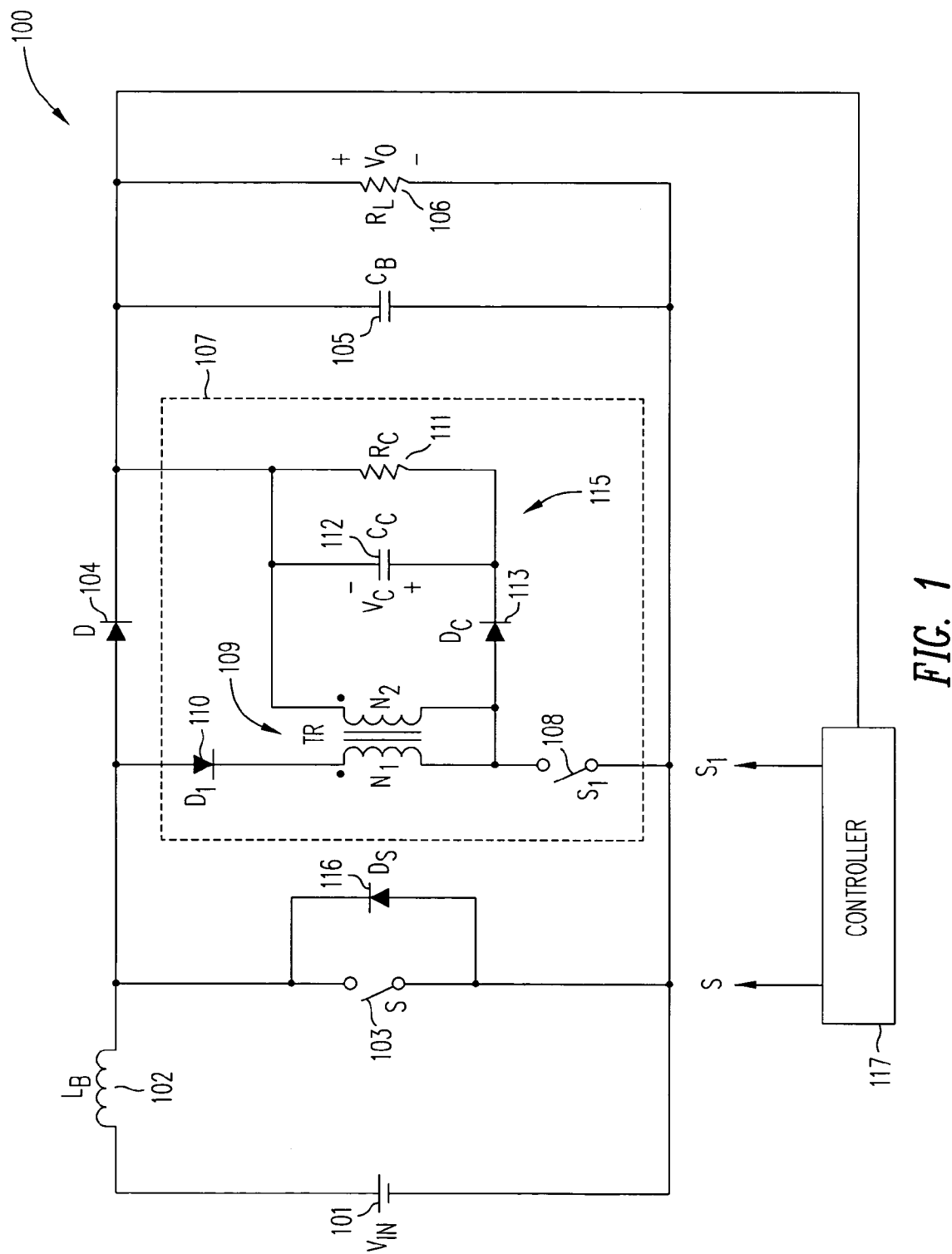
FIG. 1 shows soft-switched boost circuit 100, in accordance with one embodiment of the present invention.

FIG. 1 shows soft-switched boost circuit 100, in accordance with one embodiment of the present invention. Soft-switched boost circuit 100 includes voltage source 101 representing input voltage VIN, boost inductor 102 (inductance value $L_B$), boost switch 103, boost rectifier 104, energy-storage capacitor 105 (capacitance value $C_B$), load 106 (resistance value $R_L$), and active snubber circuit 107 formed by auxiliary switch 108, transformer 109, blocking diode 110, and clamp circuit 115 formed by resistor 111 (resistance value $R_C$), clamp capacitor 112 (capacitance value $C_C$) and diode 113. To facilitate explanation of circuit operation in soft-switched boost circuit 100, FIG. 2 provides simplified circuit model 200 for soft-switch boost circuit 100, with voltage and current reference directions indicated.

Figure 2:
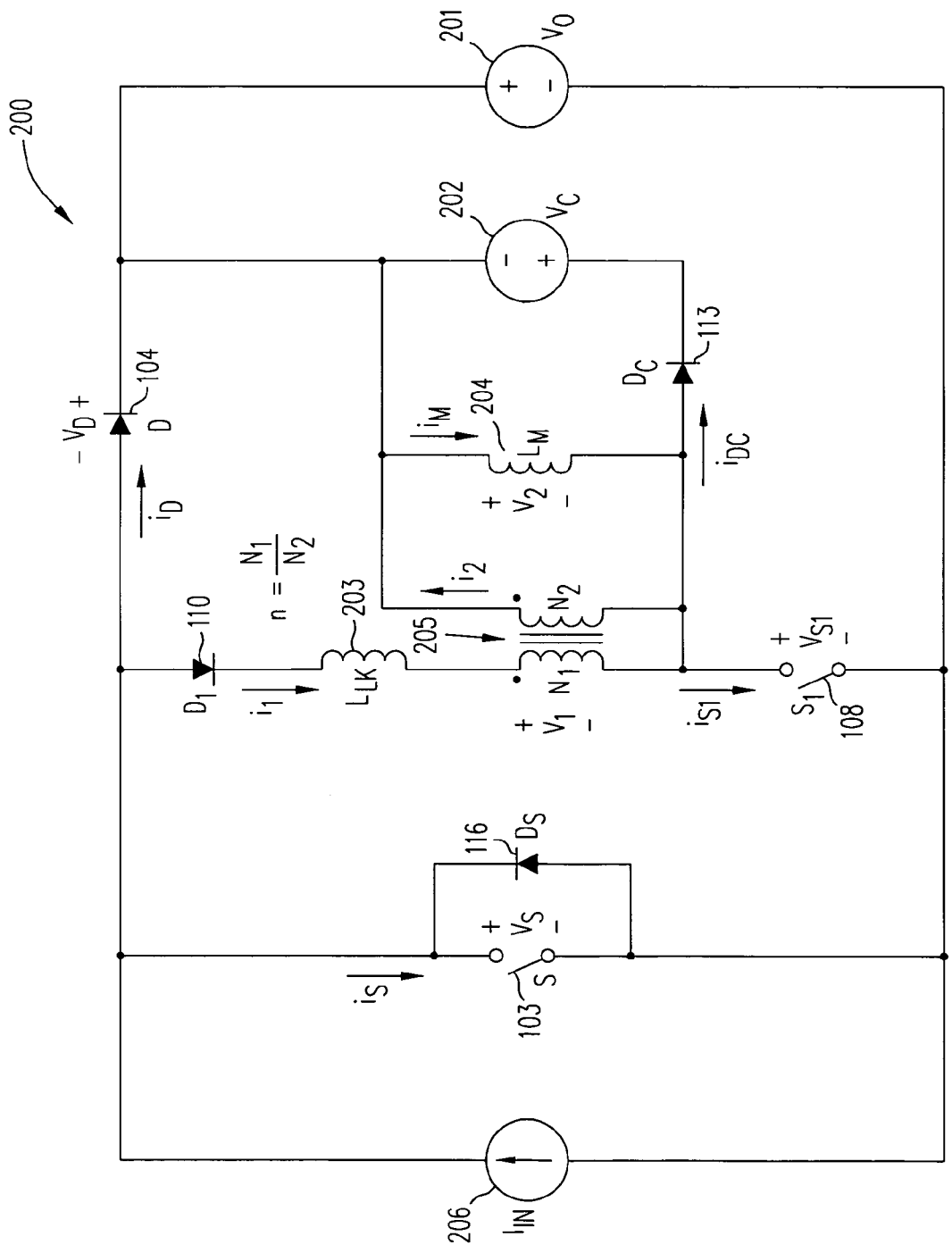
FIG. 2 shows simplified circuit model 200 for soft-switch boost circuit 100 of FIG. 1.

In FIG. 2, voltage sources 201 and 202 model energy-storage capacitor 105 and clamp capacitor 112, respectively, by assuming that the capacitance value $C_B$ of energy-storage capacitor 105 and the capacitance value $C_C$ of clamp capacitor 112 are large enough so that the voltage ripple across each capacitor is small compared to its DC voltage. In addition, constant current source $I_{IN}$ models boost inductor 102 by assuming that inductance value $L_B$ is sufficiently large so that the current through boost inductor 102 over a switching cycle does not change significantly. Also, transformer 109 of FIG. 1 is modeled by the combination of leakage inductor 203 (inductance value $L_{LK}$), magnetizing inductor 204 (inductance value $L_M$), and ideal transformer 205

$$\left(\text{turns ratio } n = \frac{N_1}{N_2}\right).$$

In the "on" state, semiconductor switch components are assumed to exhibit zero resistance (i.e., they are short circuits). However, the output and junction capacitances of the switches, and the reverse-recovery charge values of the associated rectifiers are modeled with non-zero values.

FIGS. 3(a)–(k) are topological stages of circuit model 200 of FIG. 2 during a switching cycle. The key waveforms of circuit model 200 are shown in FIGS. 4(a)–4(k). The reference directions of currents and voltages plotted in FIGS. 4(a)–4(k) are annotated in FIG. 2. FIGS. 4(a) and 4(b) show waveforms 401 and 402 of drive signals $S_1$ and S provided to boost switch 103 and auxiliary switch 108, respectively. According to the present invention, soft-switched boost circuit 100 operates with overlapping drive signals S and $S_1$. For example, as shown in FIGS. 4(a) and 4(b), drive signal $S_1$ of auxiliary switch 108 is turned "on" (i.e., driving signal $S_1$ to a voltage that closes auxiliary switch 108) at time $T_0$, prior to signal S of switch 103 being turned "on" between times $T_3$ and $T_4$. However, signal $S_1$ of switch 108 is turned "off" (i.e., driving signal $S_1$ to a voltage that opens auxiliary switch 108) before signal S of boost switch 103 is turned "off."

Prior to signal $S_1$ of switch 108 turning "on" at time $T_0$, both boost switch 103 and auxiliary switch 108 are open and input current $i_{IN}$ flows entirely through boost rectifier 104 into load 106. As shown in FIG. 3(a), after switch 108 closes at time $T_0$, current $i_1$ (waveform 405, FIG. 4(e)) flows in primary winding $N_1$ of transformer 109, thereby inducing current $i_2$ in secondary winding $N_2$. In FIG. 3(a), representing the circuit condition between times $T_0$ and $T_1$, output voltage $V_O$ (i.e., voltage across voltage source 201) is impressed across winding $N_2$ of ideal transformer 205. Consequently, transformer winding voltages $v_1$ and $v_2$ across the primary and secondary windings of ideal transformer 205, respectively, are given by the equations:

$$\sigma_2 = V_O, \tag{1}$$

$$v_1 = \frac{N_1}{N_2} V_O = nV_O \tag{2}$$

where $$n = \frac{N_1}{N_2} < 1.$$

Since voltage $v_1$ across the primary winding of ideal transformer 205 is assumed to be substantially constant, the voltage applied across leakage inductance $L_{LK}$ of transformer 109 is also accordingly substantially constant, so that current $i_1$ (waveform 405, FIG. 4(e)) increases linearly with a slope of $$\frac{di_1}{dt} = \frac{V_O - v_1}{L_{LK}} = \frac{V_O - nV_O}{L_{LK}} = (1-n)\frac{V_O}{L_{LK}}. \quad (3)$$

At the same time, magnetizing inductor current $i_M$ (waveform 408, FIG. 4(h)) of transformer 109 also increases, with a slope given by $$\frac{di_M}{dt} = \frac{V_O}{L_M}, \quad (4)$$

so that current $i_{S1}$ (waveform 406, FIG. 4(f)) in auxiliary switch 108 is given by:

$$i_{S1} = i_1 - i_2 + i_M = i_1 - \frac{N_1}{N_2}i_1 + i_M = (1-n)\cdot i_1 + i_M \quad (5)$$

applying the relationship between the primary and secondary currents in ideal transformer 205 (i.e., $N_1 i_1 = N_2 i_2$), and recognizing that blocking diode 113 is reversed biased (i.e., open circuit).

As current $i_1$ in the primary winding of ideal transformer 205 linearly increases, current $i_D$ (waveform 410, FIG. 4(j)) in boost rectifier 104 decreases at the same rate, as the sum of currents $i_1$ and $i_D$ equals constant input current $I_{IN}$, (i.e., $i_1 + i_D = I_{IN}$), when boost switch 103 is open. Therefore, current $i_D$ in boost rectifier 104 of circuit 100 has a turn-off rate given by:

$$\frac{di_D}{dt} = -(1-n)\frac{V_O}{L_{LK}} \quad (6)$$

According to equation (6), the turn-off current rate in boost rectifier 104 can be controlled in a proper design of transformer 109. Specifically, the turn-off current rate of change is determined by leakage inductance $L_{LK}$ and turns ratio n. For today's fast-recovery rectifiers, the turn-off boost rectifier current rate of change $$\frac{di_D}{dt}$$

can be kept around 100 A/μs.

Figure 3C:
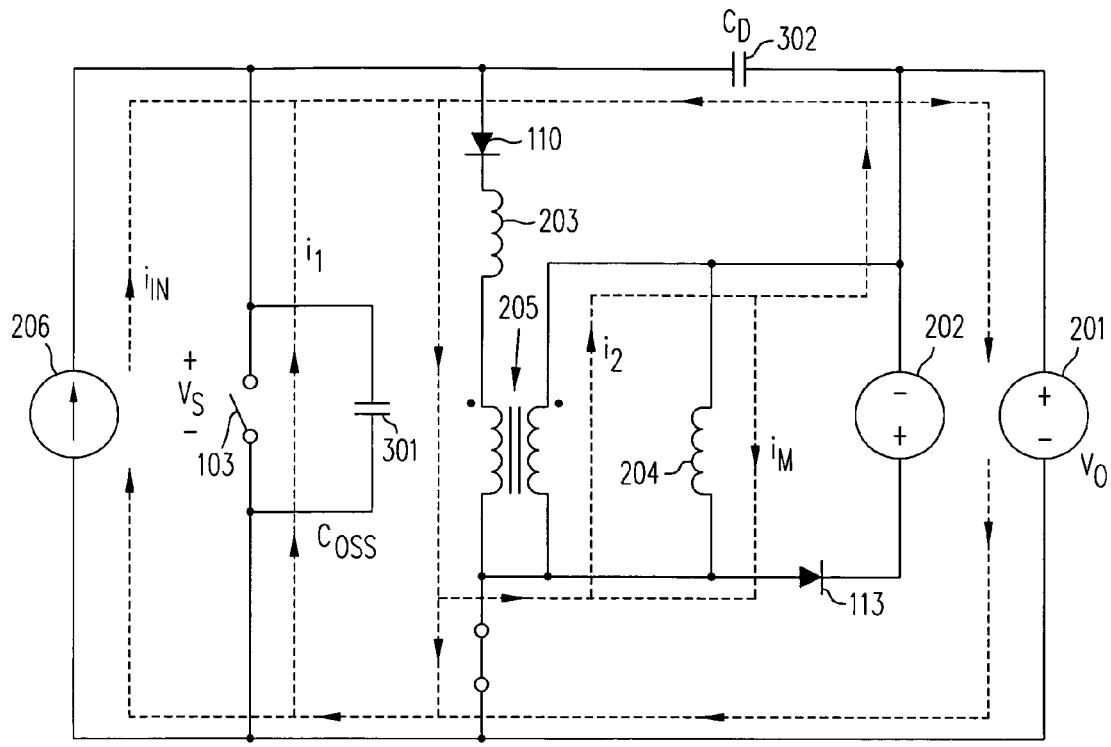

At time $T_1$, boost rectifier current $i_D$ falls to zero. Due to a stored charge in boost rectifier 104, boost rectifier current $i_D$ continues to flow between times $T_{1\ and\ T2}$ in the negative direction ("reverse-recovery current"), as shown in FIGS. 3(b) and 4(j). Generally, for a properly selected leakage inductance value $L_{LK}$ for transformer 109 and turns ratio n, this reverse-recovery current is substantially reduced, as compared to the reverse-recovery current in a circuit without boost rectifier turn-off current rate control. After the stored charge in boost rectifier 104 falls to zero at time $T_2$, boost rectifier 104 regains its voltage blocking capability and the condition of circuit 100 can be represented by the topological stage of FIG. 3(c). During this topological stage (i.e., between times $T_2$ and $T_3$), junction capacitor 302 of boost rectifier 104 (capacitance value $C_D$) is charged and output capacitor 301 of boost switch 103 (capacitance $C_{OSS}$) is discharged through a resonance between parallel connection of capacitors 301 and 302 and leakage inductor 203 (inductance $L_{LK}$). Between times $T_2$ and $T_3$, current $i_1$ in leakage inductor 203 and voltage $v_S$ (waveform 404, FIG. 4(d)) across boost switch 103 are given, respectively, by:

$$i_1 = I_{IN} + I_{RR(PK)} + \frac{(1-n)V_O}{Z_C}\sin(\omega_R t) \quad (7)$$

and $$v_S = V_O - (1-n)V_O(1-\cos(\omega_R t)), \quad (8)$$

where characteristic impedance $Z_C$ and resonant angular frequency $\omega_R$ are defined as $$Z_C = \sqrt{\frac{L_{LK}}{C_{OSS} + C_D}} \quad (9)$$

$$\omega_R = \frac{1}{\sqrt{L_{LK}(C_{OSS} + C_D)}}, \quad (10)$$

and $I_{RR(PK)}$ is the residual reverse-recovery current in boost rectifier 104.

Equation (8) shows that the condition for completely discharging output capacitor 301 of boost switch 103 at time $T_3$ (therefore, allowing zero-voltage closing of boost switch 103 at time $T_3$) is given by:

$$v_S(t=T_3) = V_O - (1-n)V_O(1-\cos \pi) = 0, \quad (11)$$

Accordingly, the maximum turns ratio $n_{MAX}$ of transformer 109 is provided by:

$$n_{MAX} = 0.5 \quad (12)$$

Figure 3D:
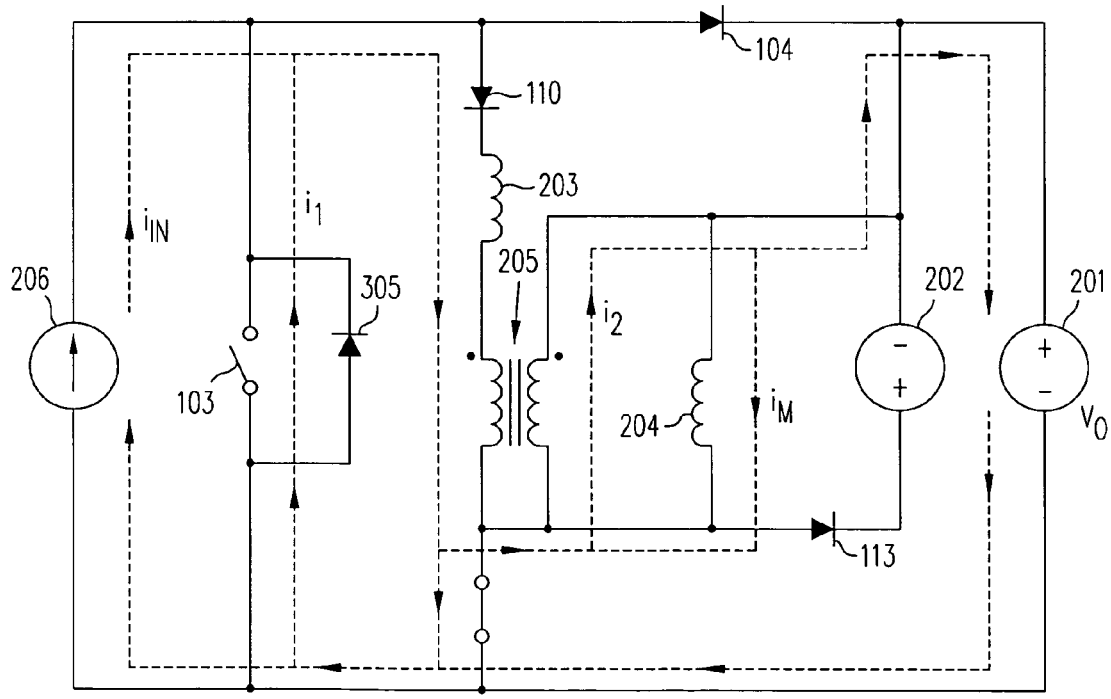

If turns ratio is less than 0.5, output capacitor 301 of boost switch 103 can always discharge to zero regardless of the load and line conditions. Once capacitor 301 fully discharges at time $T_3$, current $i_1$ (waveform 405, FIG. 4(e)) continues to flow through antiparallel diode 303 of boost switch 103, as shown in FIG. 3(d). (FIG. 3(d) represents the circuit condition between times $T_3$ and $T_4$.) During this time, voltage $v_1$ is impressed in the negative direction across leakage inductor 203, so that current $i_1$ in leakage inductor 203 linearly decreases at the rate given by $$\frac{di_1}{dt} = -\frac{nV_O}{L_{LK}}, \quad (13)$$

as illustrated in FIG. 4(e). As a result, current is, (waveform 406, FIG. 4(f)) in auxiliary switch 108 also decreases linearly, while current is of boost switch 103 (waveform 407, FIG. 4(g)) increases linearly from a negative peak. To achieve ZVS of boost switch 103, boost switch 103 closes before its current (i.e., current is) becomes positive at time $T_4$ (i.e., when current is begins to flow through the antiparallel diode 303 of boost switch 103).

Figure 3E:
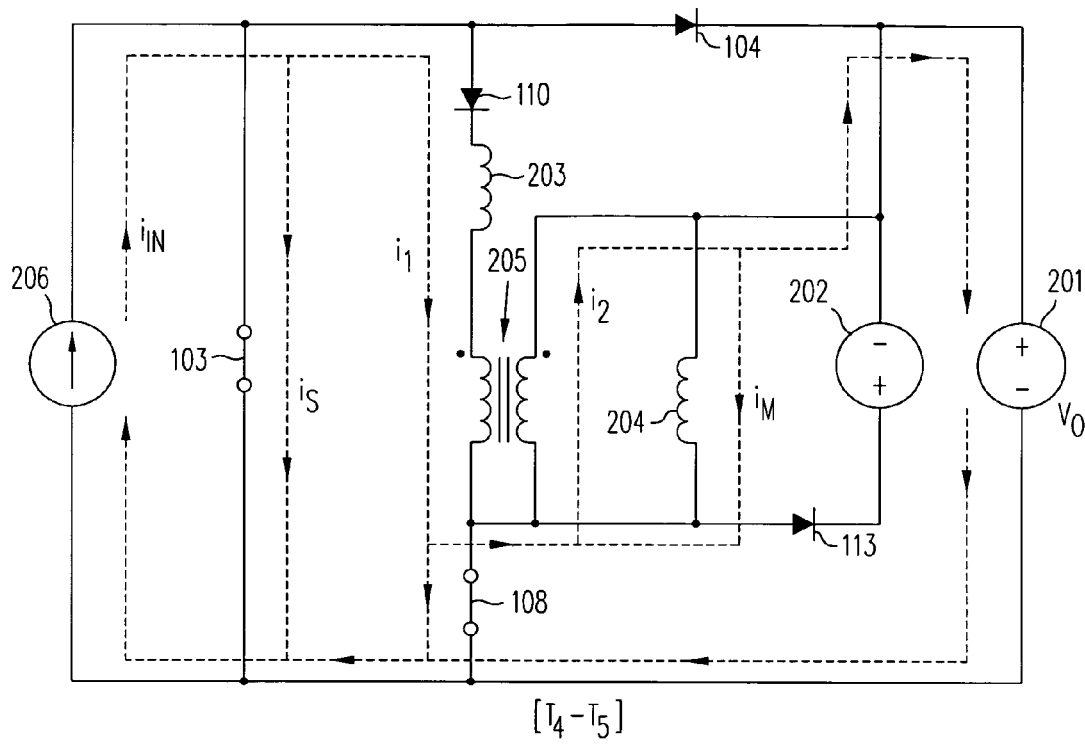
Figure 3F:
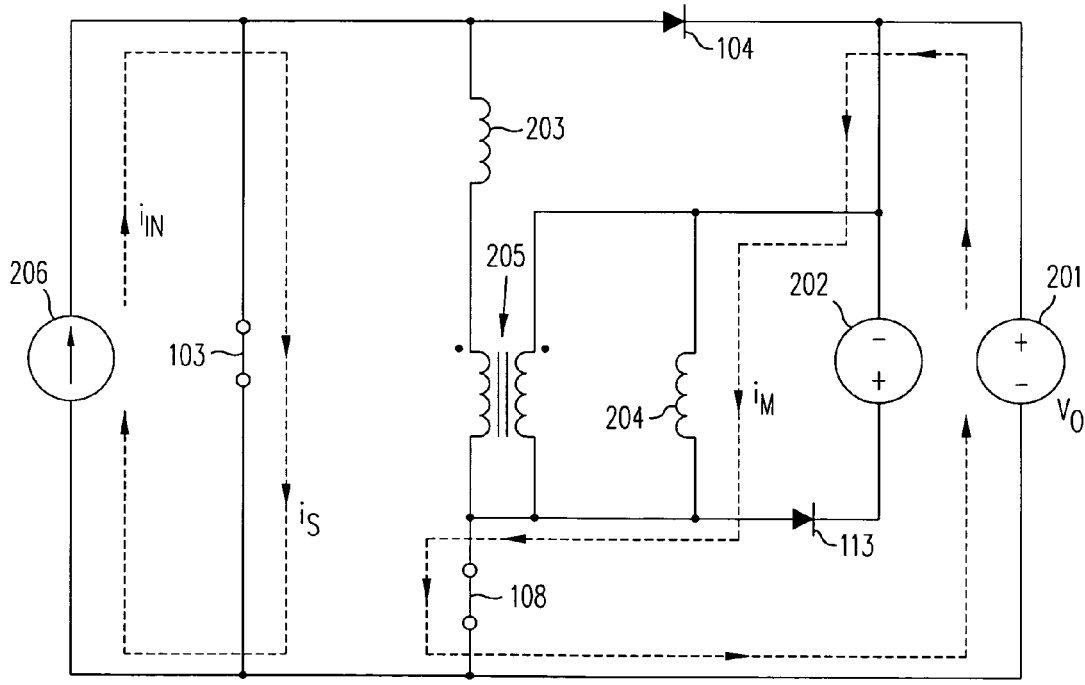

Boost-switch current is continues to flow through closed boost switch 103 after current is becomes positive at time $T_4$, as shown in FIGS. 3(e) and 4(g). Between times $T_4$ and $T_5$, current $i_1$ in leakage inductor continues to decrease linearly toward zero, while current is in boost switch 103 continues to linearly increase at the same rate. When current $i_1$ becomes zero at time $T_5$, boost-switch current is reaches $I_{IN}$ so that the entire input current $I_{IN}$ flows through boost switch 103, as shown in the topological stage of FIG. 3(f), between times $T_5$ and $T_6$. At same time, auxiliary switch 108, controlled by signal $S_1$, carries only the magnetizing current in magnetizing inductor 204. If the magnetizing inductance of transformer 109 is made high, magnetizing current $i_M$ (waveform 408, FIG. 4(h)) in magnetizing inductor 204 can be minimized (i.e. current $i_M$ can be made much smaller than input current $I_{IN}$), so that auxiliary switch 108 can open with virtually zero current, at time $T_6$.

Figure 3G:
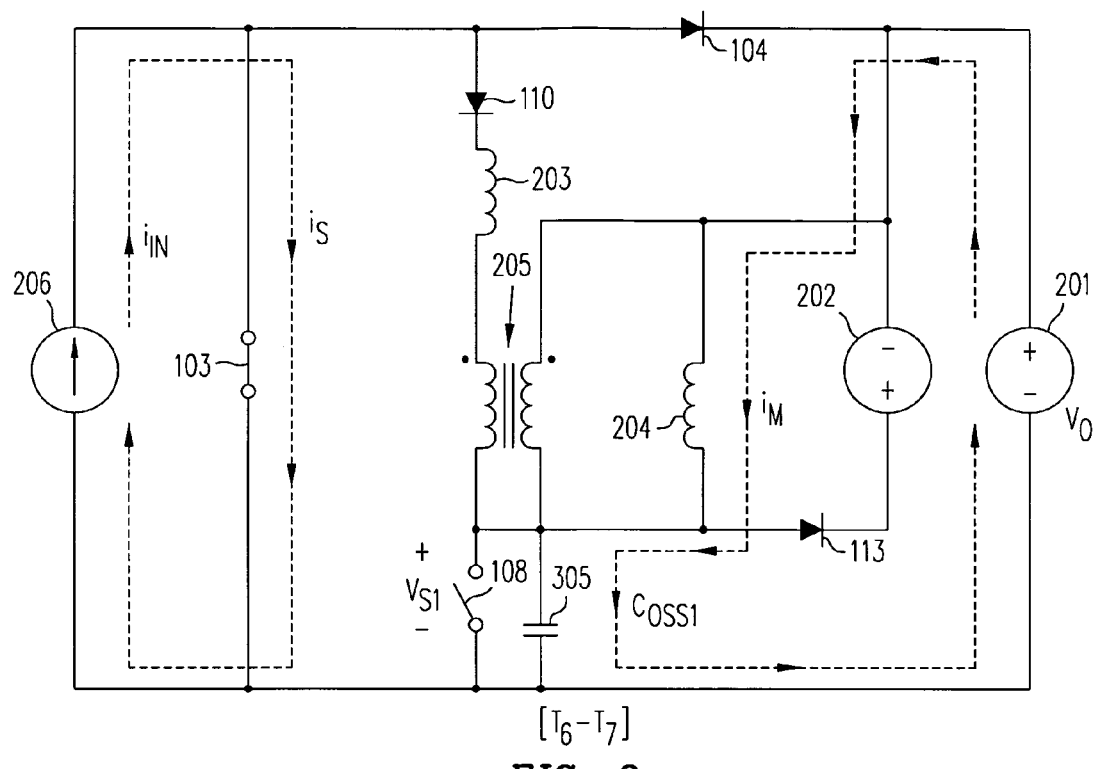
Figure 3H:
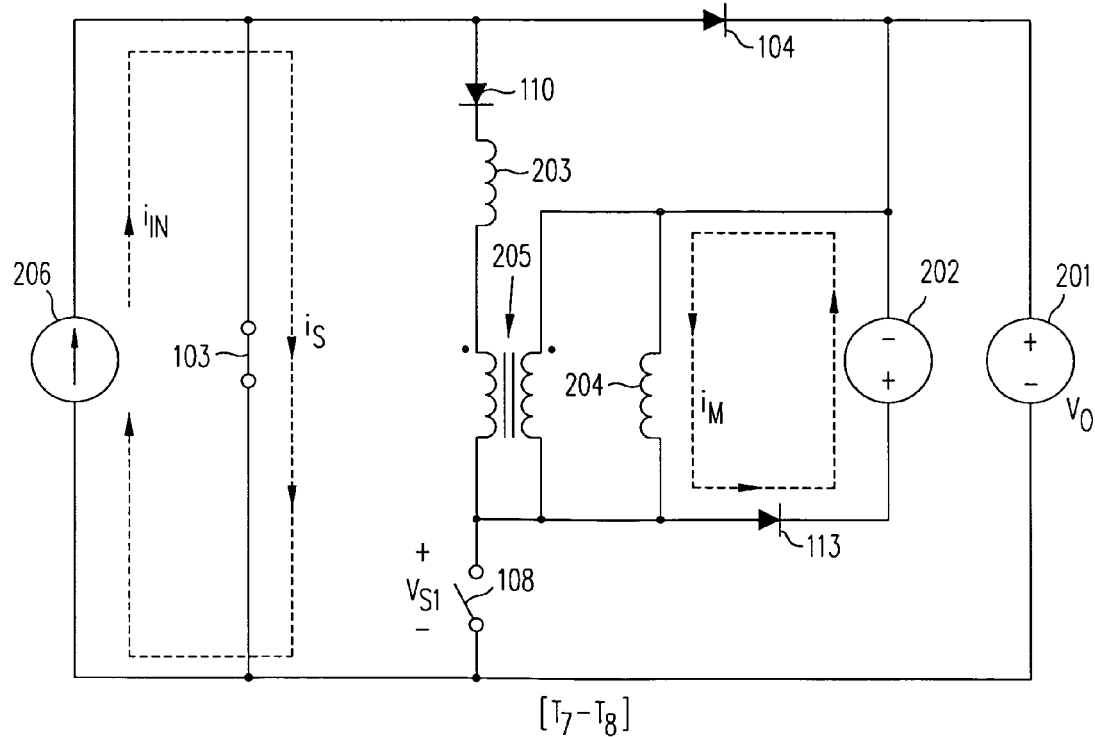

When auxiliary switch 108 opens near ZCS (zero current switching) at time $T_6$, magnetizing current $i_M$ starts charging output capacitor 305 (capacitance $C_{OSS1}$) of auxiliary switch 108, as shown in FIG. 3(g). At time $T_7$, when voltage $v_{S1}$ (waveform 403, FIG. 4(c)) across auxiliary switch 108 reaches clamp voltage $V_O+V_C$, where $V_C$ is voltage across clamp capacitor 112 (capacitance $C_C$, represented by voltage source 202), magnetizing current $i_M$ is commutated into the voltage source 202. As shown in FIG. 3(h), between times $T_7$ and $T_8$ the negative voltage $V_C$ across voltage source 202 resets the magnetizing current $i_M$ in magnetizing inductor 204 at a rate given by:

$$\frac{di_M}{dt} = -\frac{V_C}{L_M}, \quad (14)$$

until magnetizing current $i_M$ becomes zero at time $T_8$.

Figure 3I:
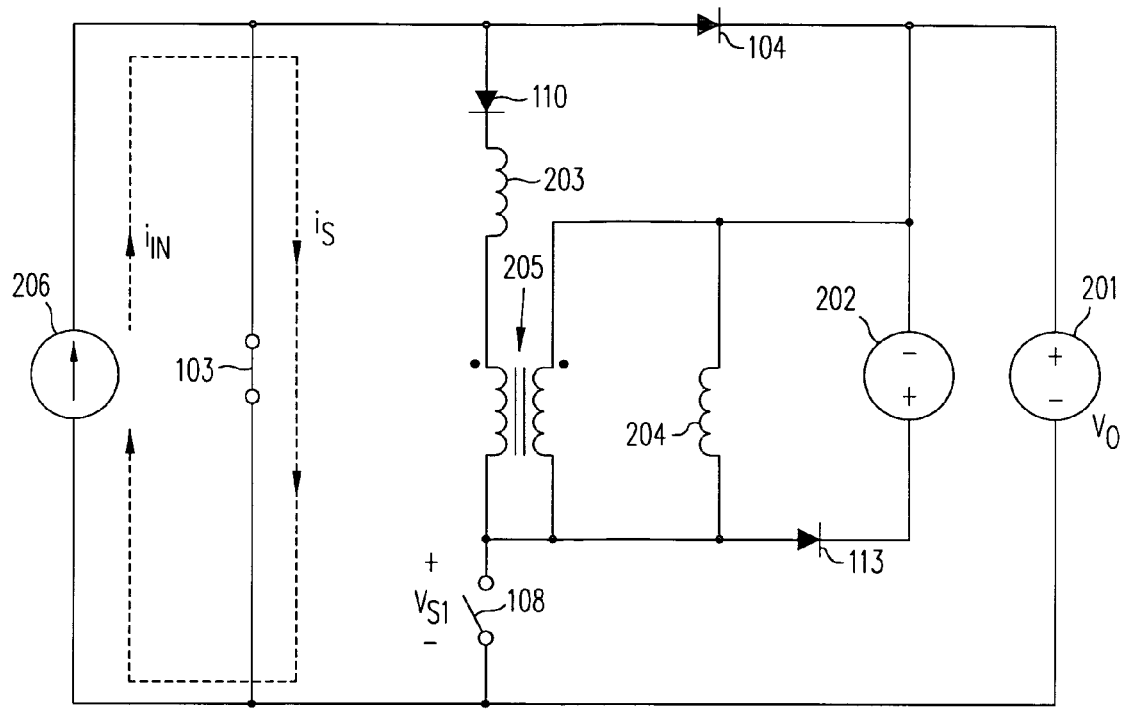
Figure 3J:
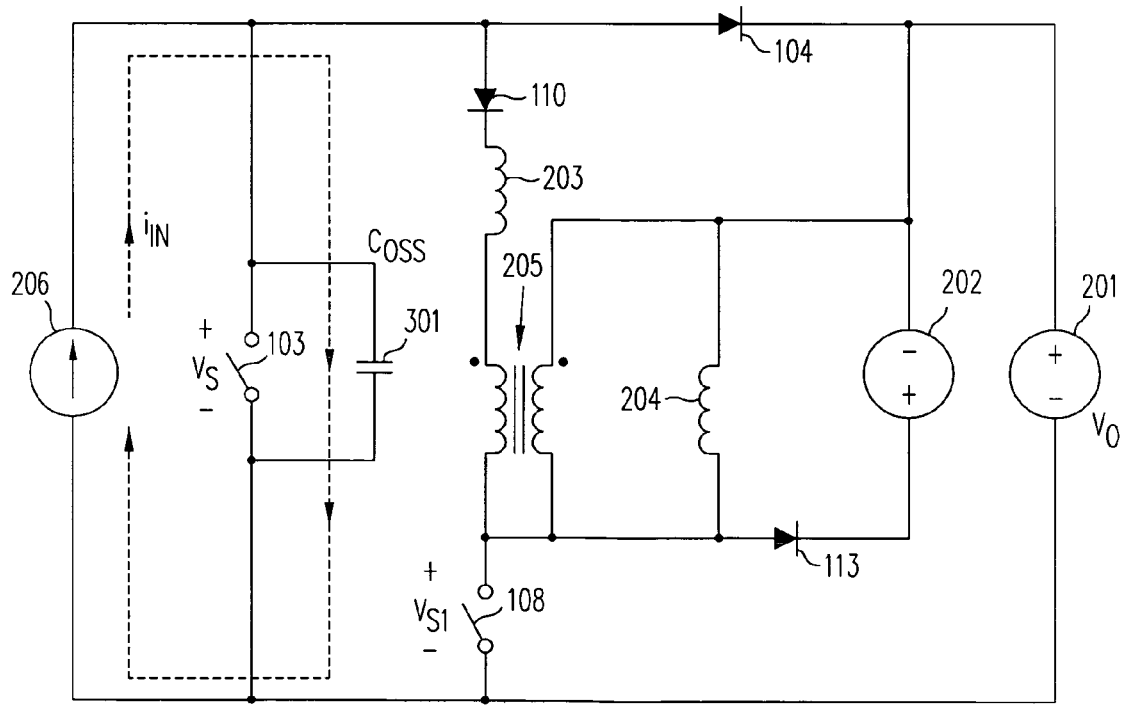
Figure 3K:
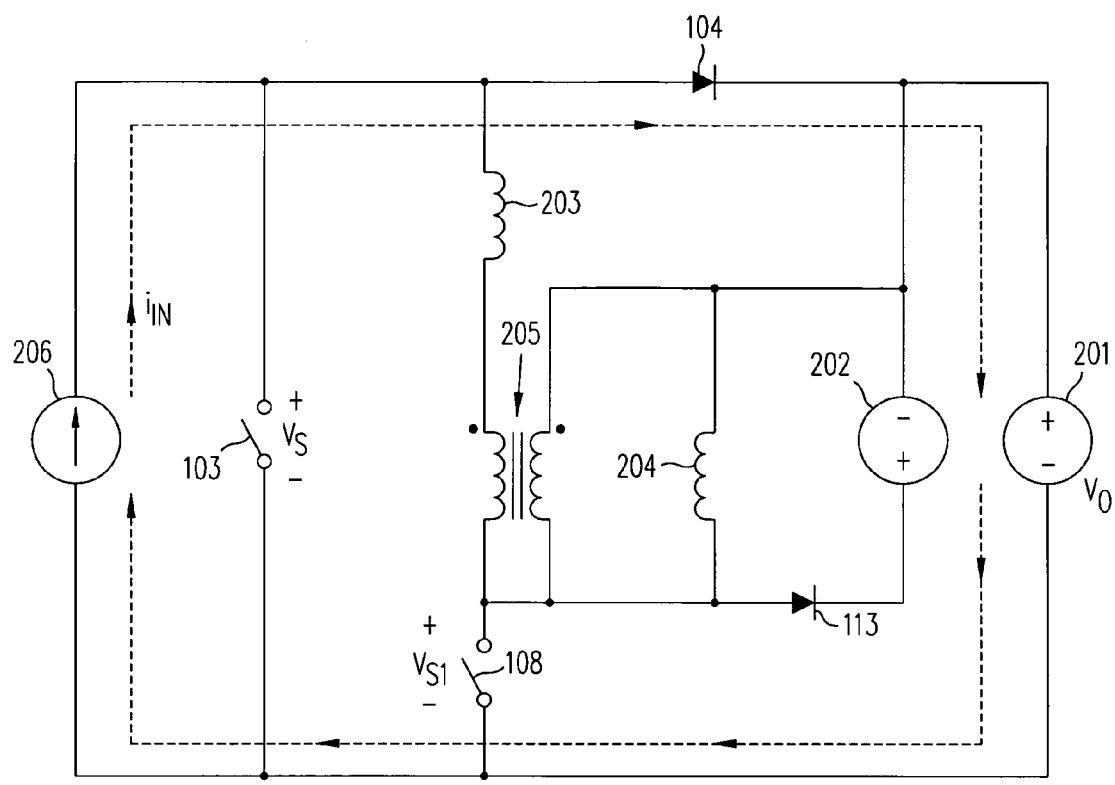

FIG. 3(i) shows the circuit condition of circuit 100 after transformer 109 is reset at time $T_8$ until boost switch 103 opens at time $T_9$ and input current $I_{IN}$ is commutated from boost switch 103 to charge boost switch 103's output capacitor 301. As shown in FIG. 3(j), between times $T_9$ and $T_{10}$, capacitor 301 charges with constant input current $I_{IN}$, voltage $v_S$ (waveform 404, FIG. 4(d)) increases linearly, reaching voltage $V_O$ at time $T_{10}$. At time $T_{10}$, input current $I_{IN}$ is instantaneously commutated to boost rectifier 104, as shown in FIG. 3(k). As shown in FIG. 3(k), current $I_{IN}$ flows as current $i_D$ (waveform 410, FIG. 4(j)) boost rectifier 104 until time $T_{11}$, when auxiliary switch 108 is closed again, as in time $T_0$.

In the above description, the junction capacitance of blocking diode 110 is assumed to have no significant effect on the operation of converter circuit 100. In fact, this capacitance plays a role only during a brief interval after current $i_1$ reaches zero at time $T_5$. Specifically, after time $T_5$, the junction capacitance of blocking diode 110 and leakage inductor 203 resonate, thus creating a small negative current $i_1$ in leakage inductor 203. If current $i_1$ is greater than magnetizing current $i_M$ in magnetizing inductor 204, current $i_{S1}$ of auxiliary switch 108 flows in the negative direction through an antiparallel diode of auxiliary switch 108. Because of this conduction in the antiparallel diode, voltage $v_{S1}$ of auxiliary switch 108 (i.e., voltage waveform 403, FIG. 4(c)) does not immediately increase after auxiliary switch 108 opens at time $T_6$ (i.e., shortly after current $i_{S1}$ in switch 108 reaches zero). As a result, the rise of voltage $v_{S1}$ across auxiliary switch 108 occurs after a brief delay—i.e., after the current is, through the antiparallel diode of auxiliary switch 108 resonates back to zero. This delay has no significant effect on the operation or the performance of circuit 100. However, if current $i_1$ in leakage inductor 203 is smaller than magnetizing current $i_M$, the rise of voltage $v_{S1}$ (waveform 403, FIG. 4(c)) across auxiliary switch 108 occurs immediately after time $T_6$.

In summary, circuit 100 of the present invention allows soft-switching of all semiconductor devices. Specifically, boost switch 103 is closes under ZVS condition, auxiliary switch 108 opens under ZCS condition, and current ID of boost diode 104 is turned off at a controlled rate. As a result, the turn-on switching loss of boost switch 103, the turn-off switching loss of auxiliary switch 108, and reverse-recovery-related losses of boost rectifier 104 are eliminated, thereby minimizing overall switching losses and maximizing conversion efficiency. In addition, soft-switching provides beneficial effect on electromagnetic interference (EMI) that may result in a reduced size requirement for an input filter.

Because of ZVS in boost switch 103, a MOSFET (Metal Oxide Semiconductor Field Effect Transistor) device, or a parallel combination of MOSFET devices, can implement boost switch 103 of circuit 100. Similarly, due to the ZCS of auxiliary switch 108, either an IGBT (Insulated Gate Bipolar Transistor) or a MOSFET can implement auxiliary switch 108 without a performance penalty. In fact, an IGBT boost switch can also implement boost switch 103, provided that a turn-off snubber capacitor is connected across the IGBT to reduce the turn-off loss due to IGBT's current-tail effect. In such an implementation, boost switch 103 should close with ZVS, so that the snubber capacitor does not contribute to the turn-on switching loss. Also, in such an implementation, the IGBT is preferably provided a co-packaged antiparallel diode, or an external diode.

In circuit 100, the voltage and current stresses on boost switch 103 and boost rectifier 104 are substantially the same as the corresponding stresses in a conventional boost converter without a snubber. The voltage stress on auxiliary switch 108 is given by:

$$V_{S1}(MAX)=V_O+V_C, \quad (15)$$

while the current stress on auxiliary switch 108, neglecting residual reverse-recovery current $I_{RR(PK)}$ (waveform 410, FIG. 4(j)) is $$i_{S1(MAX)} \cong (1-n)\left[I_{IN} + \frac{(1-n)V_O}{Z_L}\right]. \quad (16)$$

Voltage $v_{S1(max)}$ and current $i_{S1(max)}$ are shown in waveforms 403 and 406 of FIGS. 4(c) and (f).

According to Equation (15), the voltage stress of auxiliary switch 108 is controlled by the selection of clamp voltage $V_C$, which is generally determined by the energy stored in magnetizing inductor 204, while auxiliary switch 108 is conducting, and the resistive value $R_C$ of clamp resistor 111. If the capacitance value $C_C$ of capacitor 112 is selected to be large enough, so that the voltage ripple across output capacitor 112 is much smaller than the average voltage value of capacitor 112, voltage $V_C$ can be calculated from $$\frac{1}{2} L_M \left( \frac{V_O}{L_M} D_{S1} T_S \right)^2 f_S = \frac{V_C^2}{R_C}, \quad (17)$$

where $D_{S1}$ is duty cycle of auxiliary switch 108, $T_S$ is the switching period, and $F_S = 1/T_S$ is the switching frequency.

From Equation (17), $$V_C = \sqrt{\frac{R_C}{2 f_S L_M}} \cdot (D_{S1} V_O) \quad (18)$$

the voltage value $V_C$ can be minimized by maximizing inductance value $L_M$ in magnetizing inductor 204, so that the power loss in the clamp circuit (i.e., the power dissipation in clamp resistor 111) is also minimized. Typically, for a properly designed transformer, the clamp-circuit loss is negligible compared to the output power, so that conversion efficiency is practically unaffected.

The inductance of leakage inductor 203 of transformer 109 is determined from the desired turn-off rate of the boost rectifier current defined in Equation (6), i.e., $$L_{LK} = \frac{(1-n)V_O}{di_D/dt}. \quad (19)$$

Figure 5:
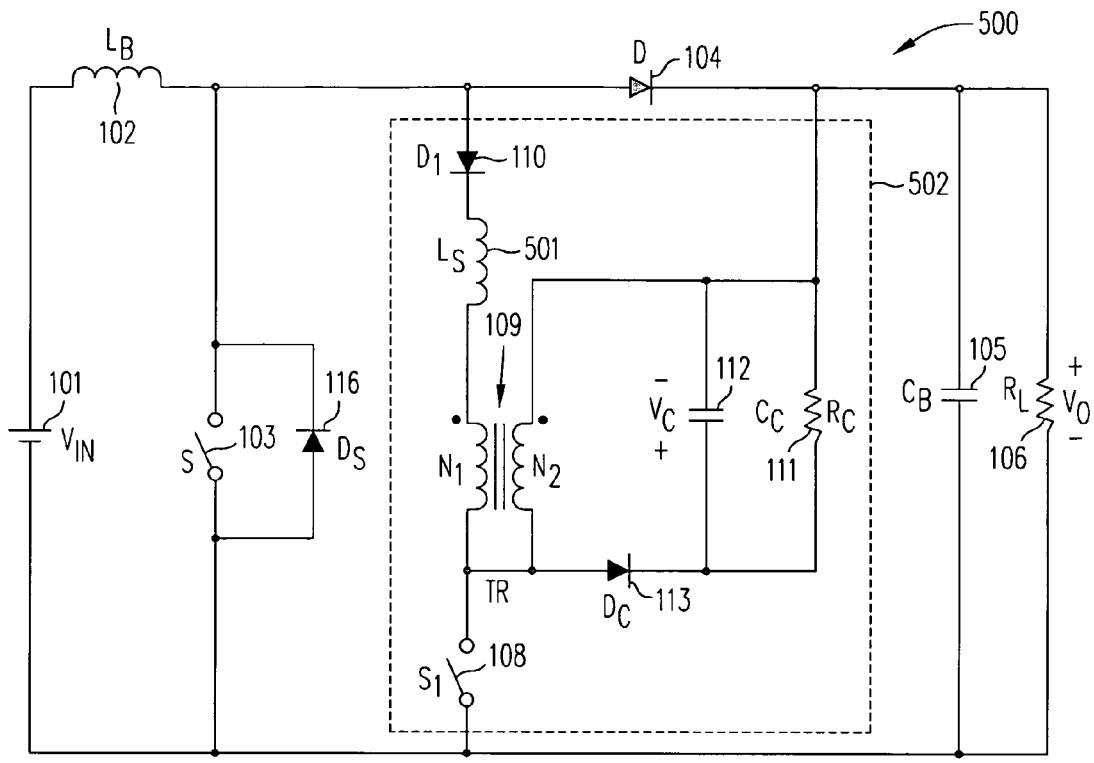
FIG. 5 shows soft-switched boost converter 500, according to one embodiment of this invention, with a separate or external snubber inductor 501.

According to Equation (19), to minimize the inductance value $L_{LK}$ of leakage inductor 203, one can increase the turns ratio n of transformer 109. Since $n_{MAX}$ is 0.5, the turns ratio of transformer 109 should not be much less than 0.5. A value of n in the 0.3–0.5 range is desirable. If $V_{O\,is}$ 400 V, n is 0.5, and $di_D/dt$ is 100 A/μs, leakage inductance value $L_{LK}$ would be 2 μH. If inductance value $L_{LK}$ is too large to be achieved by the leakage inductance of a transformer, an external snubber inductor 501 can be used to adjust the desired circuit inductance, such as shown in circuit 500 of FIG. 5. The operation of circuit 500 in FIG. 5 is substantially the same as that of circuit 100 of FIG. 1.

Figure 6:
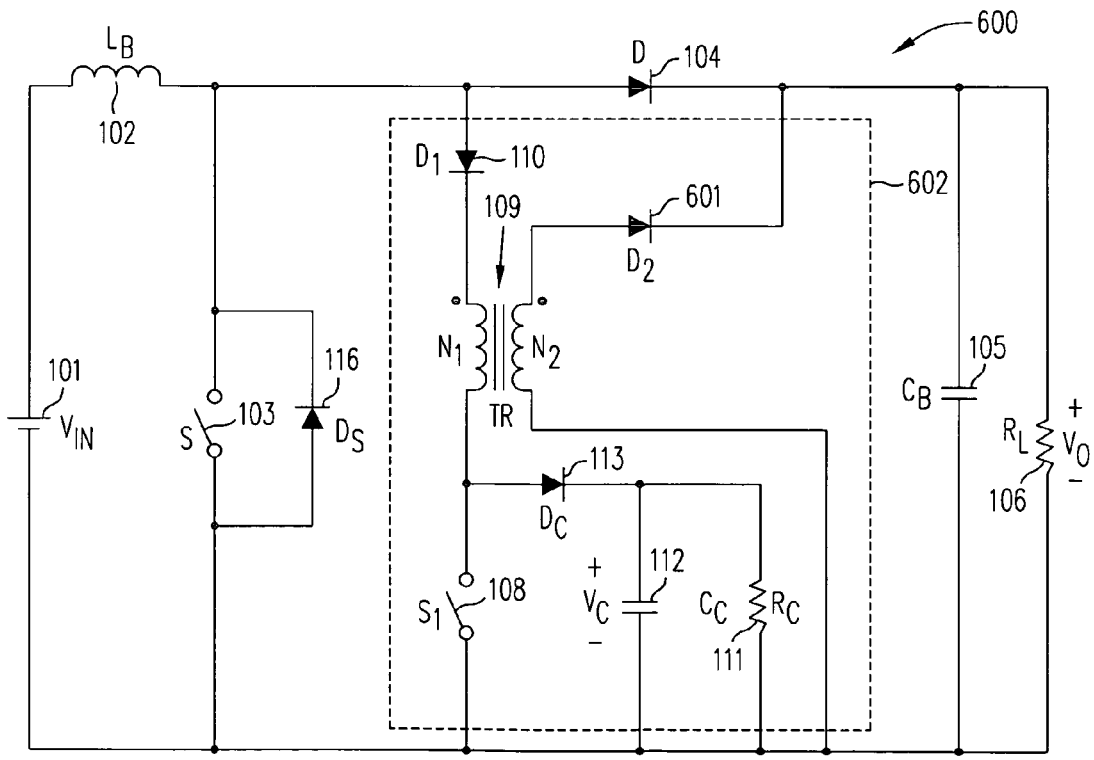
FIG. 6 shows soft-switched boost converter 600 with voltage clamp circuit 602 connected to a negative rail, according to one embodiment of the present invention.
Figure 7:
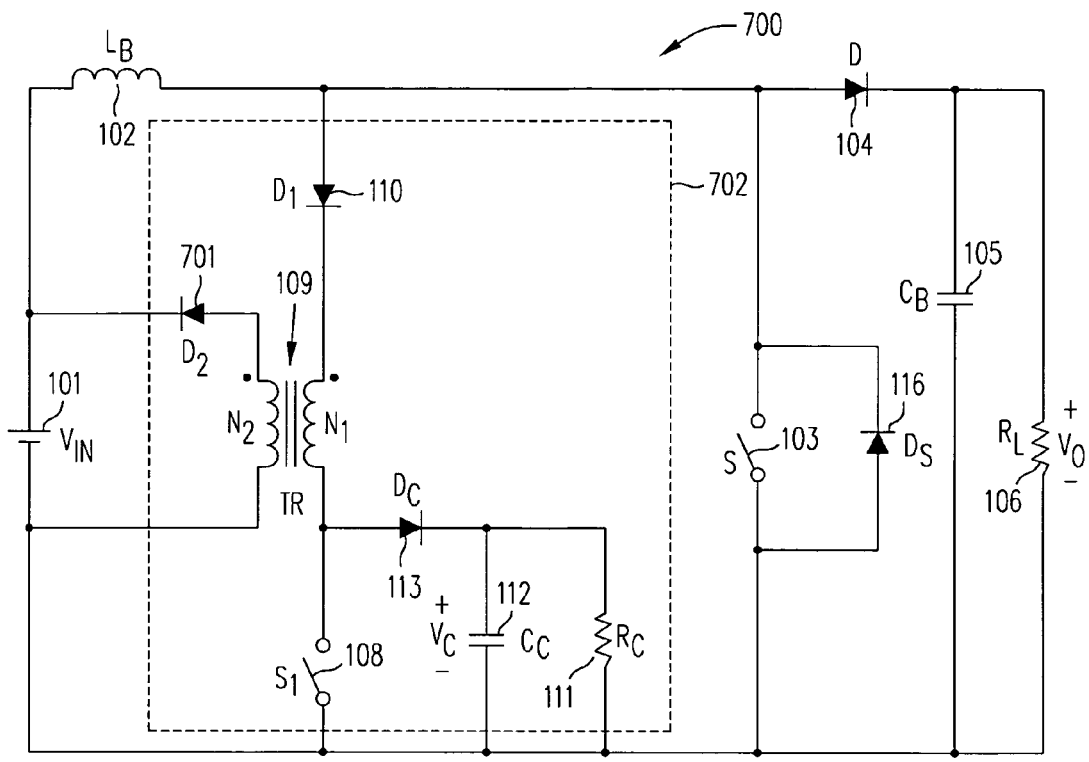
FIG. 7 shows soft-switched boost converter 700 with voltage clamp circuit 702 connected to the input source, in accordance to one embodiment of the present invention.
Figure 8:
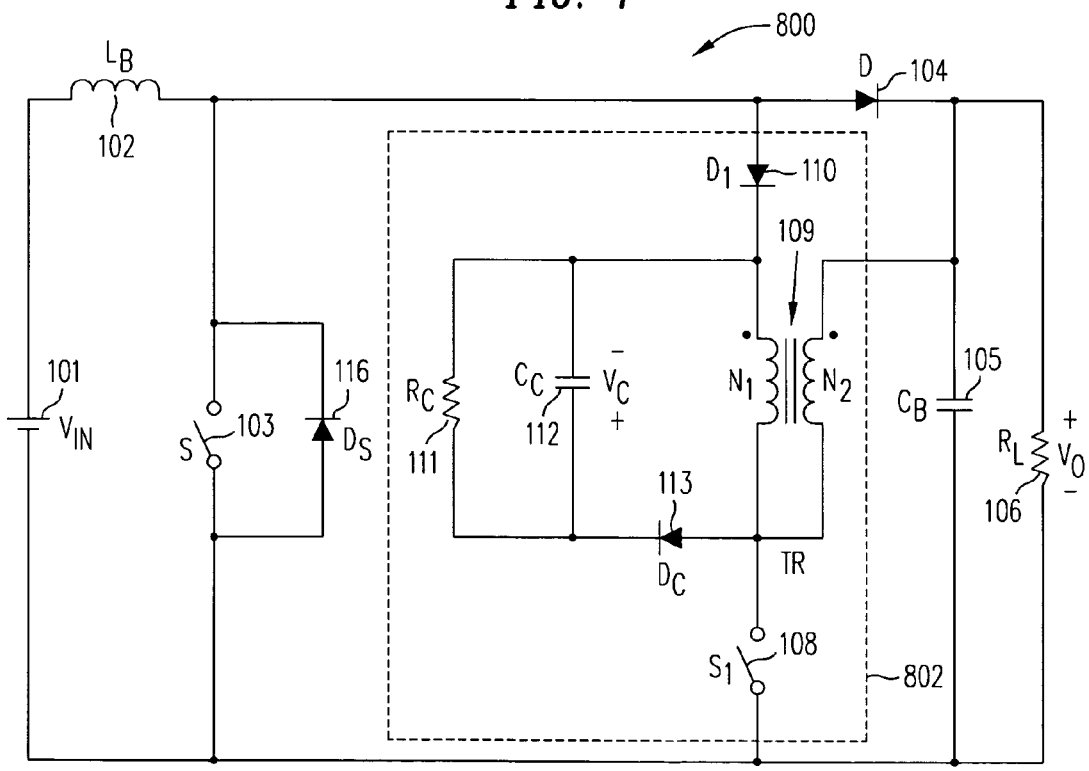
FIG. 8 shows soft-switched boost converter 800 with voltage clamp circuit 802 connected across a primary winding of a transformer, in accordance with one embodiment of this invention.
Figure 9:
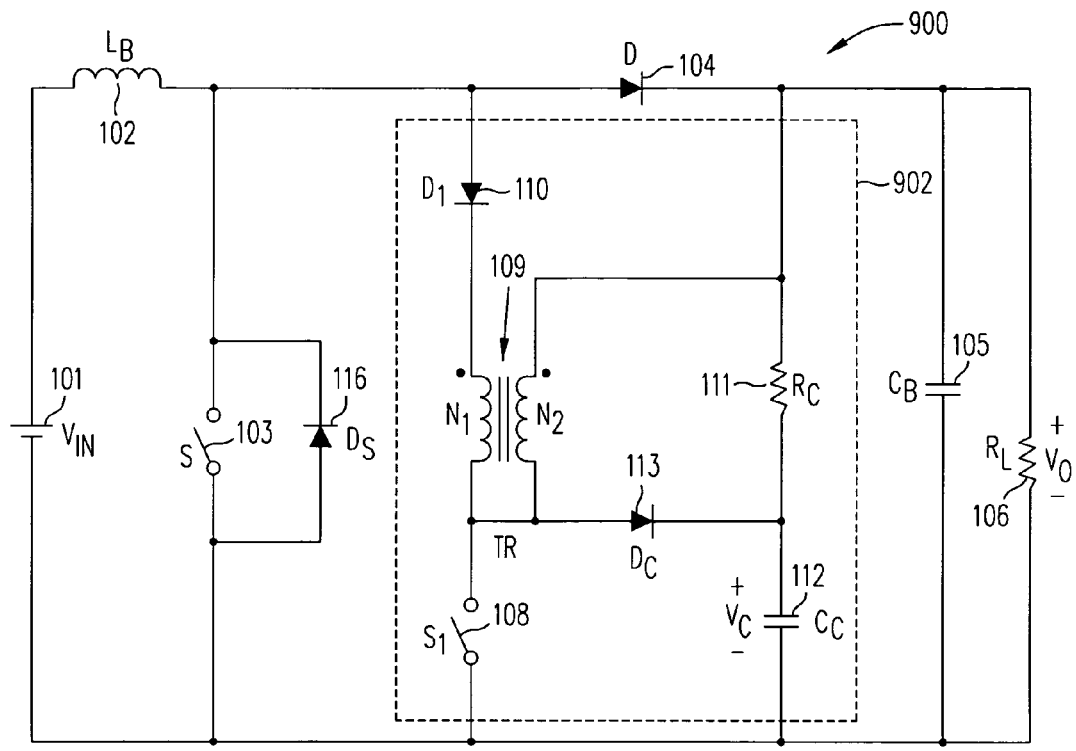
FIG. 9 shows soft-switched boost converter 900 with voltage clamp circuit 902, according to another embodiment of the present invention.

According to the present invention, a voltage clamp circuit (e.g., voltage clamp circuit 107) in an active snubber that is used to reset the magnetizing inductor (e.g., magnetizing inductor 204) of the transformer can be implemented in numerous ways. For example, the voltage clamp circuit can be connected to any DC potential in the circuit. In FIGS. 1 and 5, voltage-clamp circuits 107 and 502 are each connected to the output terminals of the converter. FIGS. 6 and 7 show circuits 600 and 700 having voltage clamp circuits 602 and 702 that are connected to the negative rail and the input source, respectively. Furthermore, the voltage-clamp circuit can also be fitted across the primary winding of transformer 109, as illustrated in FIG. 8. FIG. 9 shows circuit 900 with voltage clamp circuit 902, according to another embodiment of the present invention. Many other variations of the voltage-clamp circuit are also possible.

Figure 10:
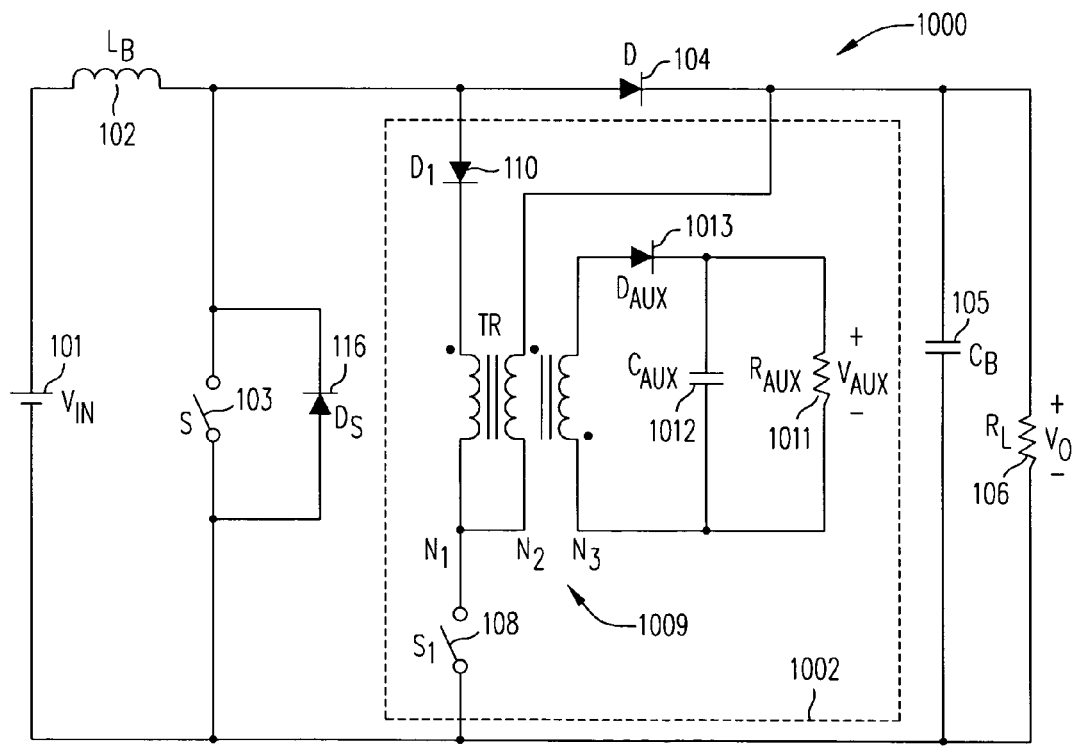
FIG. 10 shows soft-switched boost converter 1000 providing an integrated auxiliary isolated power supply.

A soft-switched boost converter of this invention can also be implemented using an integrated isolated auxiliary power supply, such as shown in circuit 1000 of FIG. 10. In circuit 1000, an isolated auxiliary output voltage $V_{AUX}$ is provided by three-winding transformer 1009, active-snubber switch 108, windings $N_2$ and $N_3$, rectifier 1013 ($D_{AUX}$), and filter capacitor 1012 (having capacitance value $C_{AUX}$), forming flyback converter 1002 with input terminals connected across the output terminals of boost converter 1000. Assuming a discontinuous conduction mode (DCM) of operation of transformer 1009, auxiliary output voltage $V_{AUX}$ is given by:

$$V_{AUX} = \sqrt{\frac{R_{AUX}}{2 f_S L_M}} \cdot (D_{S1} V_O), \quad (20)$$

where $R_{AUX}$ is the load on the auxiliary output.

Since output voltage $V_O$ of a regulated boost converter is constant, with the duty cycle $D_{S1}$ of auxiliary switch 108 being constant, auxiliary voltage $V_{AUX}$ in snubber 1002 changes only if the load is variable (i.e., if load resistance $R_{AUX}$ changes). For a variable auxiliary load $R_{AUX}$, auxiliary voltage $V_{AUX}$ can be maintained constant by appropriate modulation of duty cycle $D_{S1}$.

Figure 11:
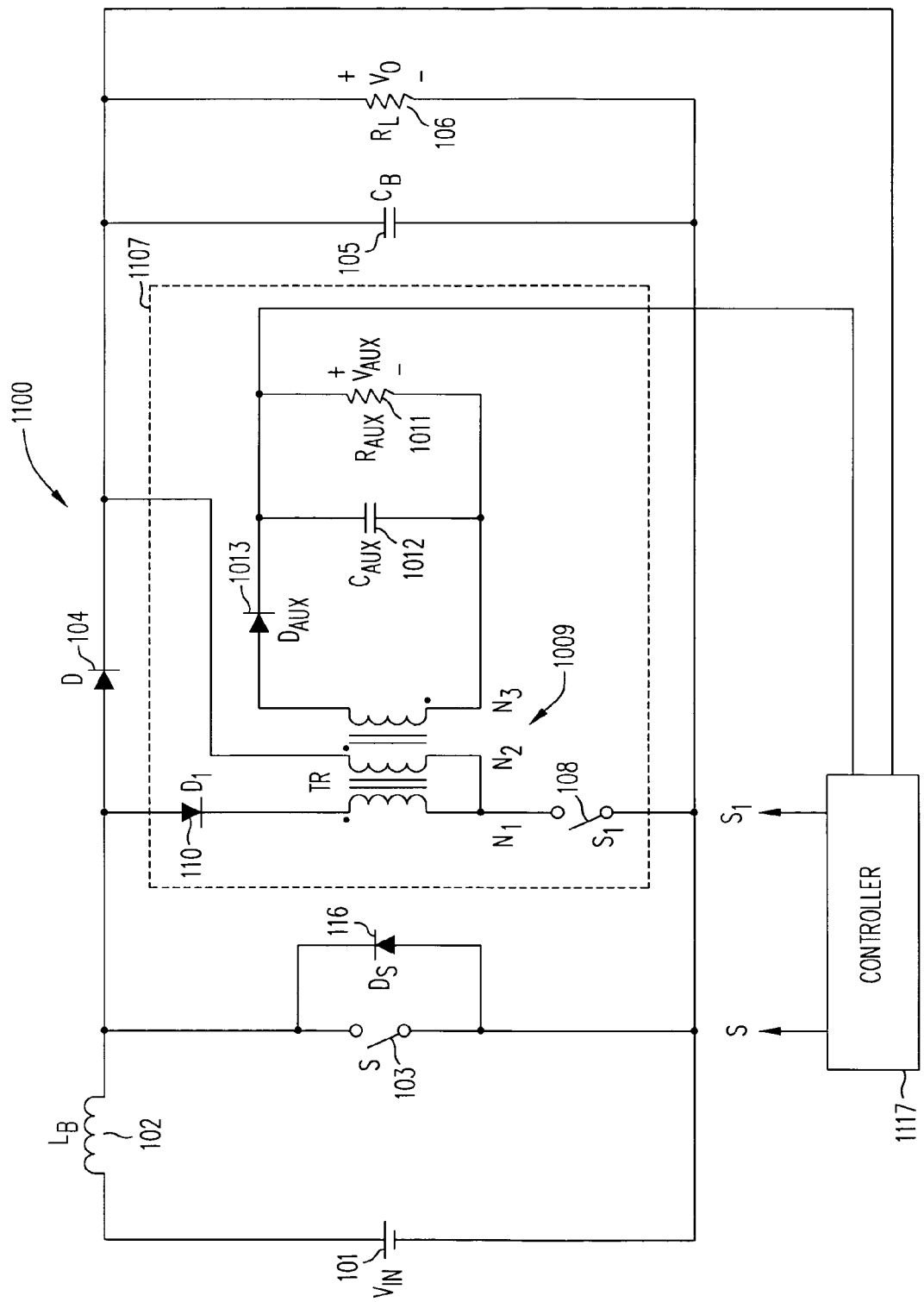
FIG. 11 shows, conceptually, circuit 1100 having a two-loop control of circuit 1000 of FIG. 10, regulating both the output voltage of boost-converter 1000 and voltage $V_{AUX}$ in the auxiliary power-supply.

For example, FIG. 11 shows, conceptually, circuit 1100 providing a close-loop control of auxiliary output voltage $V_{AUX}$ for circuit 1000 of FIG. 10. Of course, many other ways of closed-loop modulating duty cycle $D_{S1}$ are possible. In FIG. 11, two independent feedback-control loops are provided. Specifically, output voltage $V_O$ is regulated by modulating duty cycle D of boost switch 103, while auxiliary-output voltage $V_{AUX}$ is regulated by modulating the duty cycle $D_{S1}$ of auxiliary switch 108. To maintain proper timing of drive signals S and $S_1$ for boost switch 103 and auxiliary switch 108 (i.e., to ensure drive signal $S_1$ is asserted before drive signal S for a predetermined time interval), the rising edge of drive signal $S_1$ is generated by controller 1117 from the control loop that regulates output voltage $V_O$. The turning-off of drive signal $S_1$ is controlled by the loop that controls auxiliary output voltage $V_{AUX}$ which generates the falling edge signal.

Figure 12:
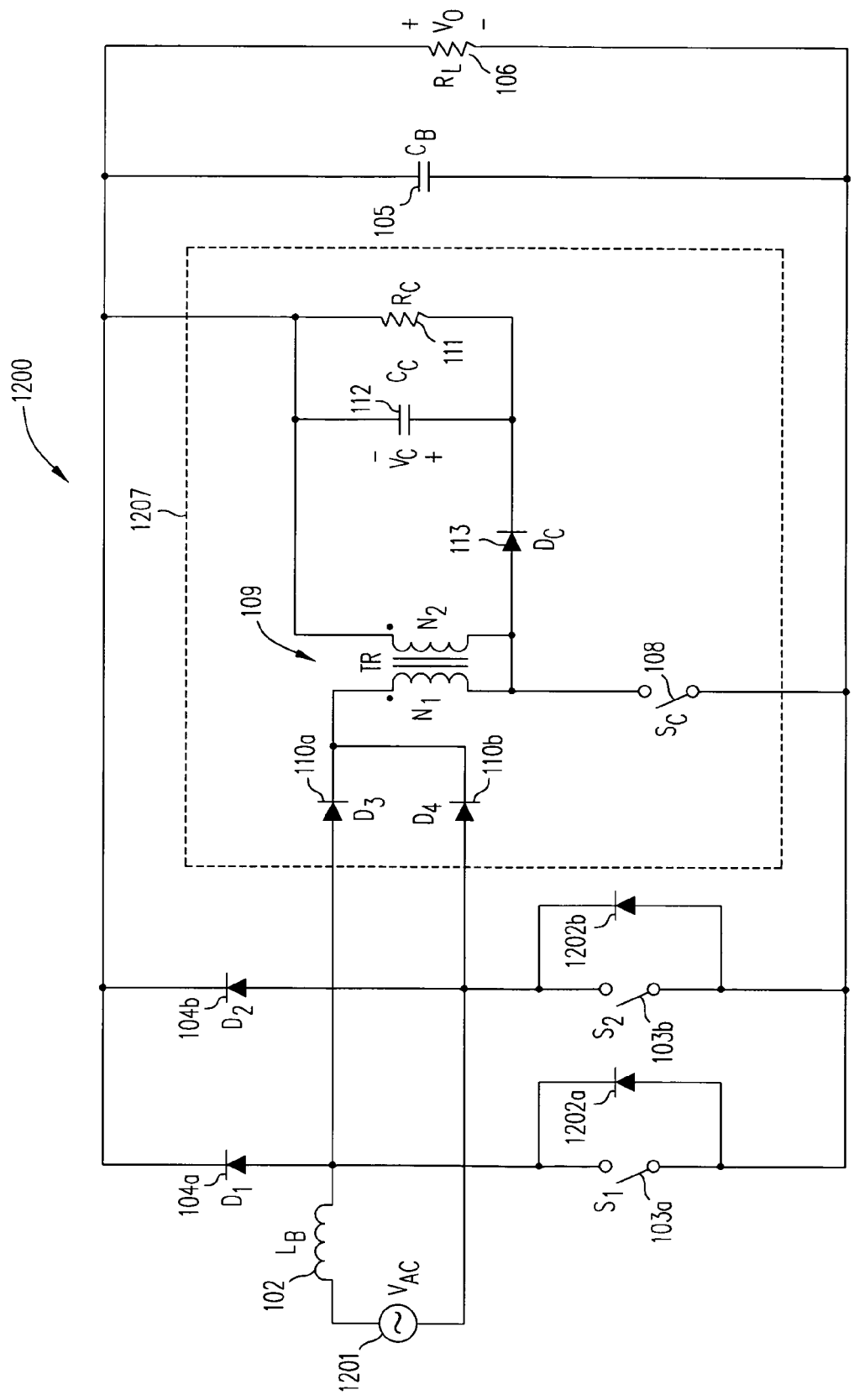
FIG. 12 shows single-phase AC/DC boost converter 1200 that is integrated with the full-wave rectifier, in accordance with one embodiment of present invention.

Soft-switched boot converter with integrated isolated power supply can also provide multiple outputs. In addition, the active snubber according to the present invention can be applied to boost converters used in single-phase and three-phase AC/DC applications such as, for example, single-phase and three-phase power-factor correction circuits. FIG. 12 shows single-phase AC/DC boost converter 1200 that is integrated with the full-wave rectifier, in accordance with one embodiment of present invention. In the circuit in FIG. 12, during positive half cycles, boost switch 103a and boost rectifier 104a operate in the manner described above for boost switch 103 and boost rectifier 104 of circuit 100 of FIG. 1, respectively, in conjunction with FIGS. 3(a)–3(k) and 4(a)–4(k). Similarly, during negative half cycles, boost switch 103b and boost rectifier 104b operate in the manner described above for boost switch 103 and rectifier 104 of circuit 100 of FIG. 1. Because of its rectifier configuration, which has one rectifier less than the conventional configuration of a full-wave bridge rectifier followed by a boost power stage, AC/DC boost converter 1200 has reduced conduction loss relative to such a conventional configuration. In FIG. 12, active snubber 1207 includes rectifiers 110a and 10b on the primary side of transformer 109, as AC/DC boost converter 1200 has boost switches 103a and 103b and boost rectifiers 104a and 104b configured to operate as two boost switch-boost rectifier pairs that do not operate simultaneously. In AC/DC boost converter 1200, rectifiers 110a and 110b are connected to the same primary winding of transformer 109, as illustrated in FIG. 12.

Figure 13:
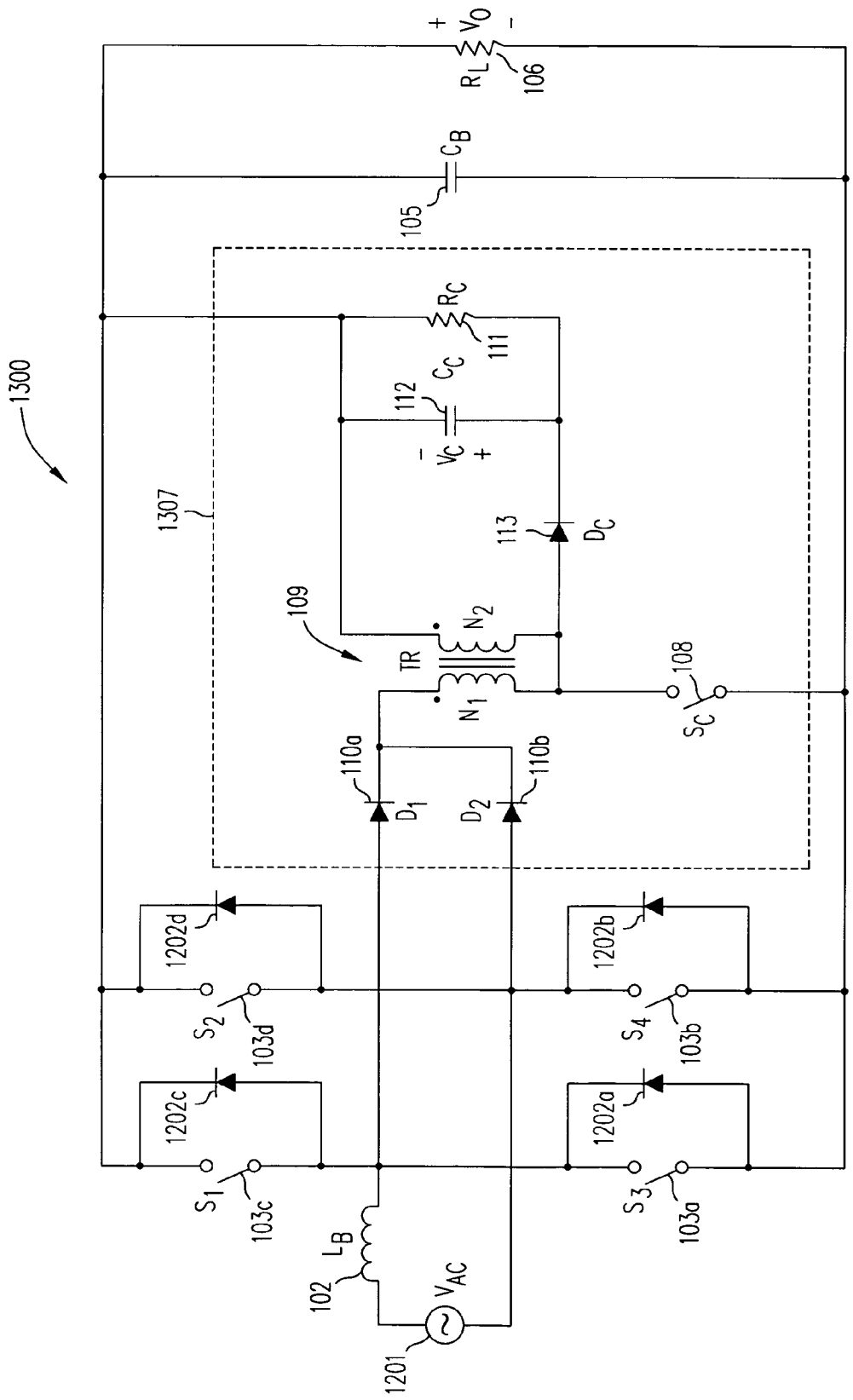
FIG. 13 shows single-phase AC/DC boost converter 1300 that is integrated with the full-wave rectifier, in accordance with one embodiment of present invention.
Figure 14:
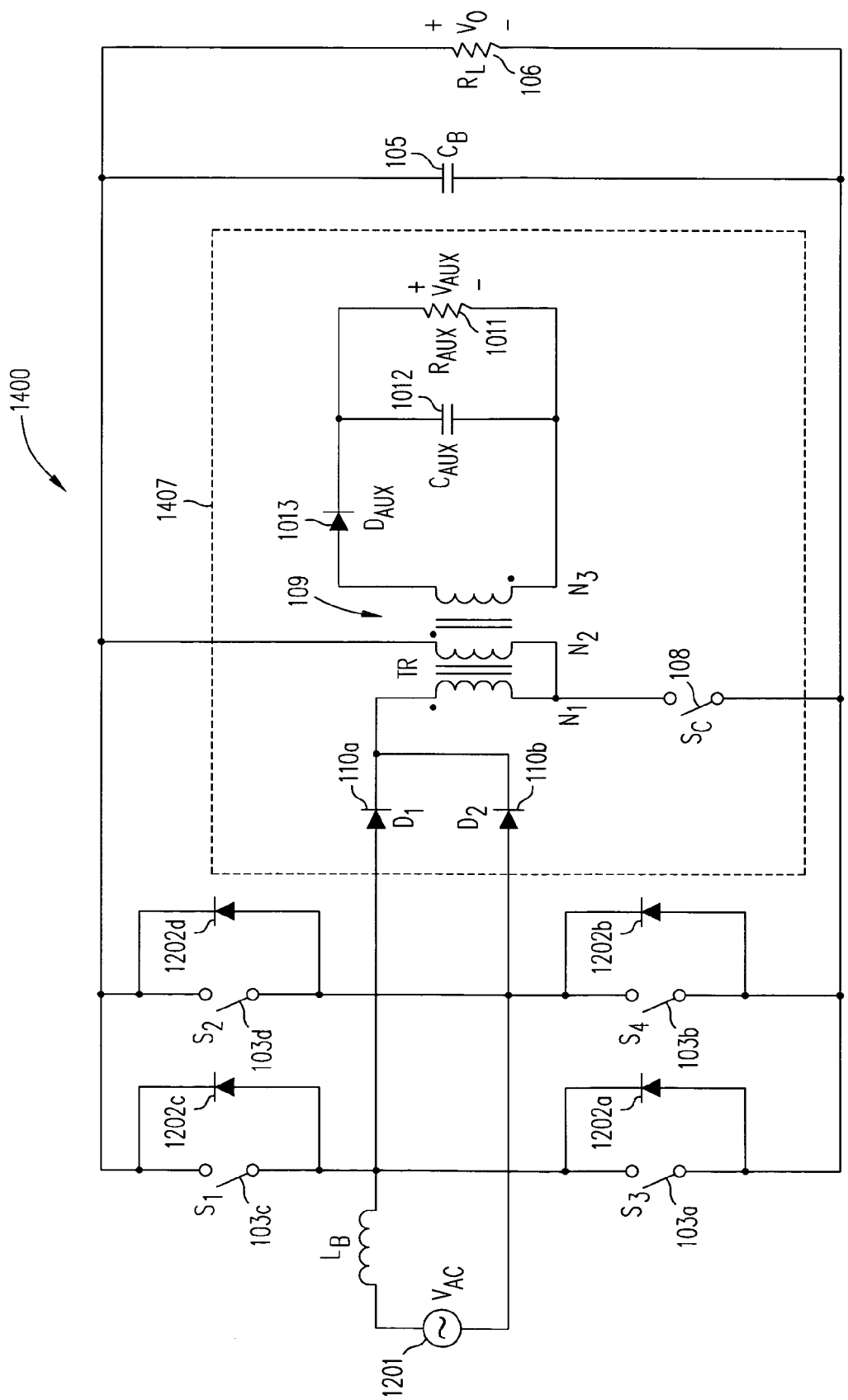
FIG. 14 shows single-phase AC/DC boost converter 1300 that is integrated with the full-wave rectifier, in accordance with one embodiment of present invention.

Many variations of AC/DC boost converter 1200 are possible, such as AC/DC boost converters 1300 and 1400 of FIGS. 13 and 14. In AC/DC boost converters 1300 and 1400 of FIGS. 13 and 14, rectifiers 104a and 104b are replaced by switches 103c and 103d, respectively, to further reduce the conduction loss. Furthermore, AC/DC boost converter 1400 of FIG. 14 integrates an auxiliary power supply with a main converter.

Figure 15:
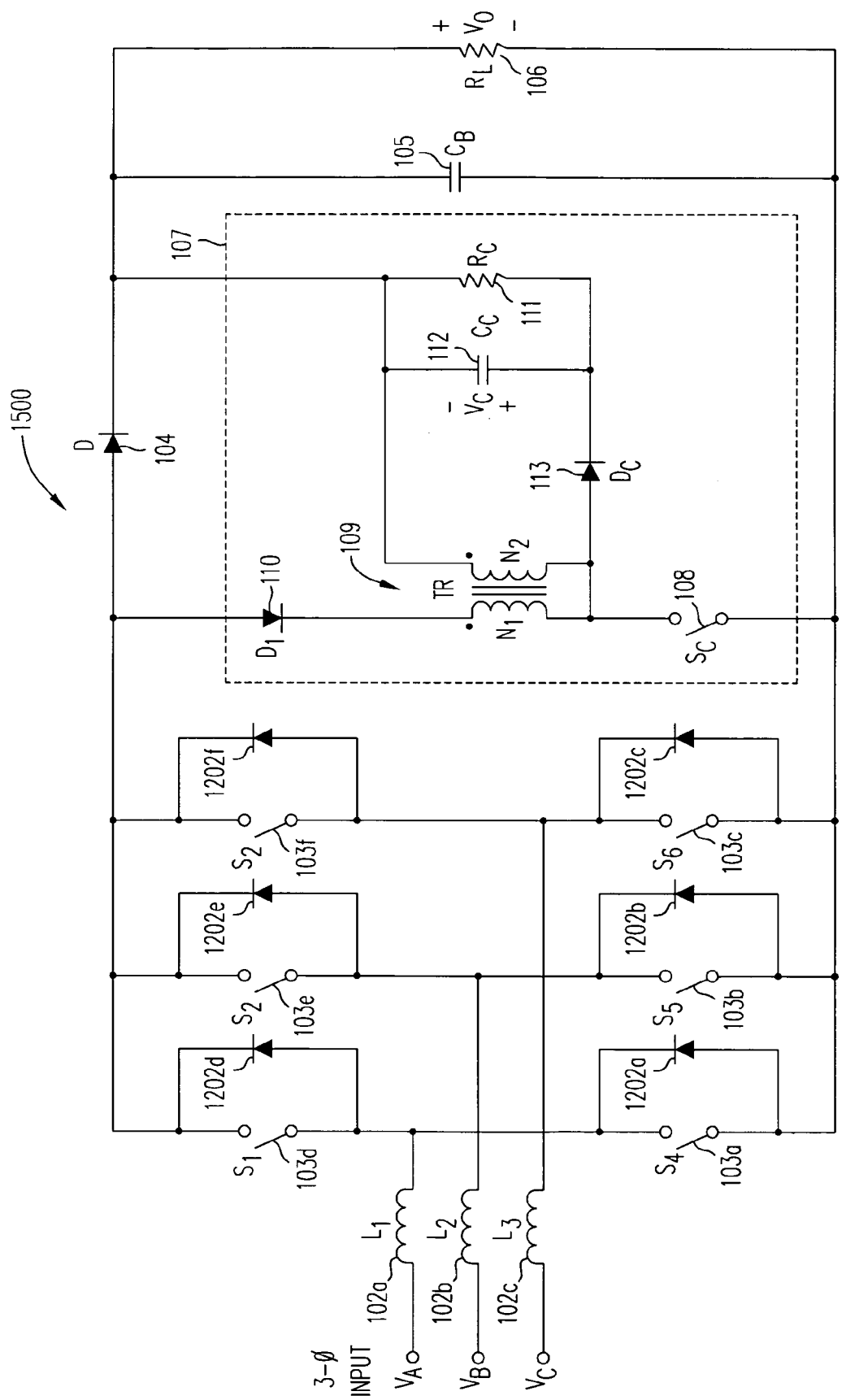
FIG. 15 shows 3-phase AC/DC boost converter 1500 with DC-rail diode 110, in accordance with one embodiment of the present invention.
Figure 16:
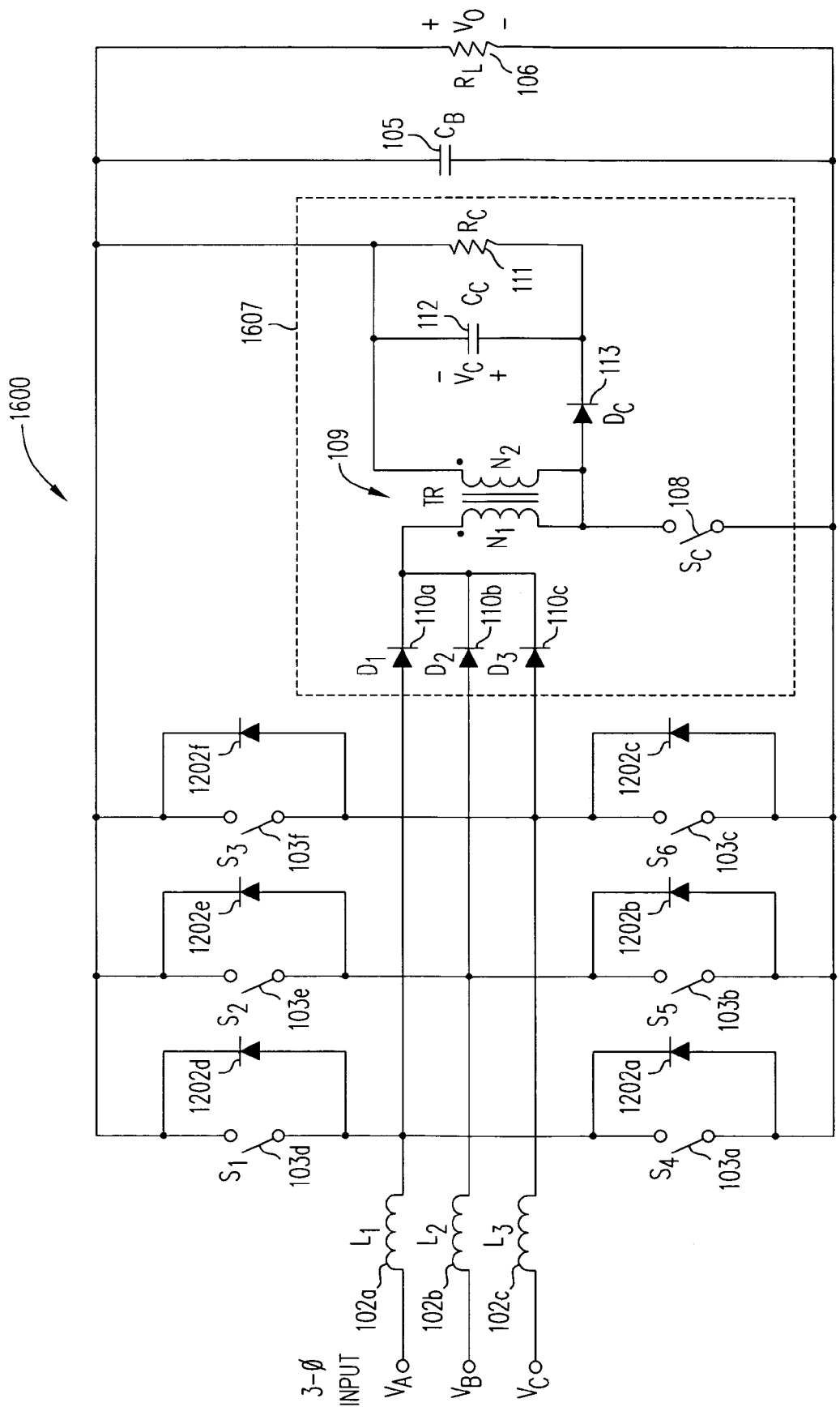
FIG. 16 shows 3-phase AC/DC boost converter 1600 with separate boost rectifiers for each phase, in accordance with the present invention.
Figure 17:
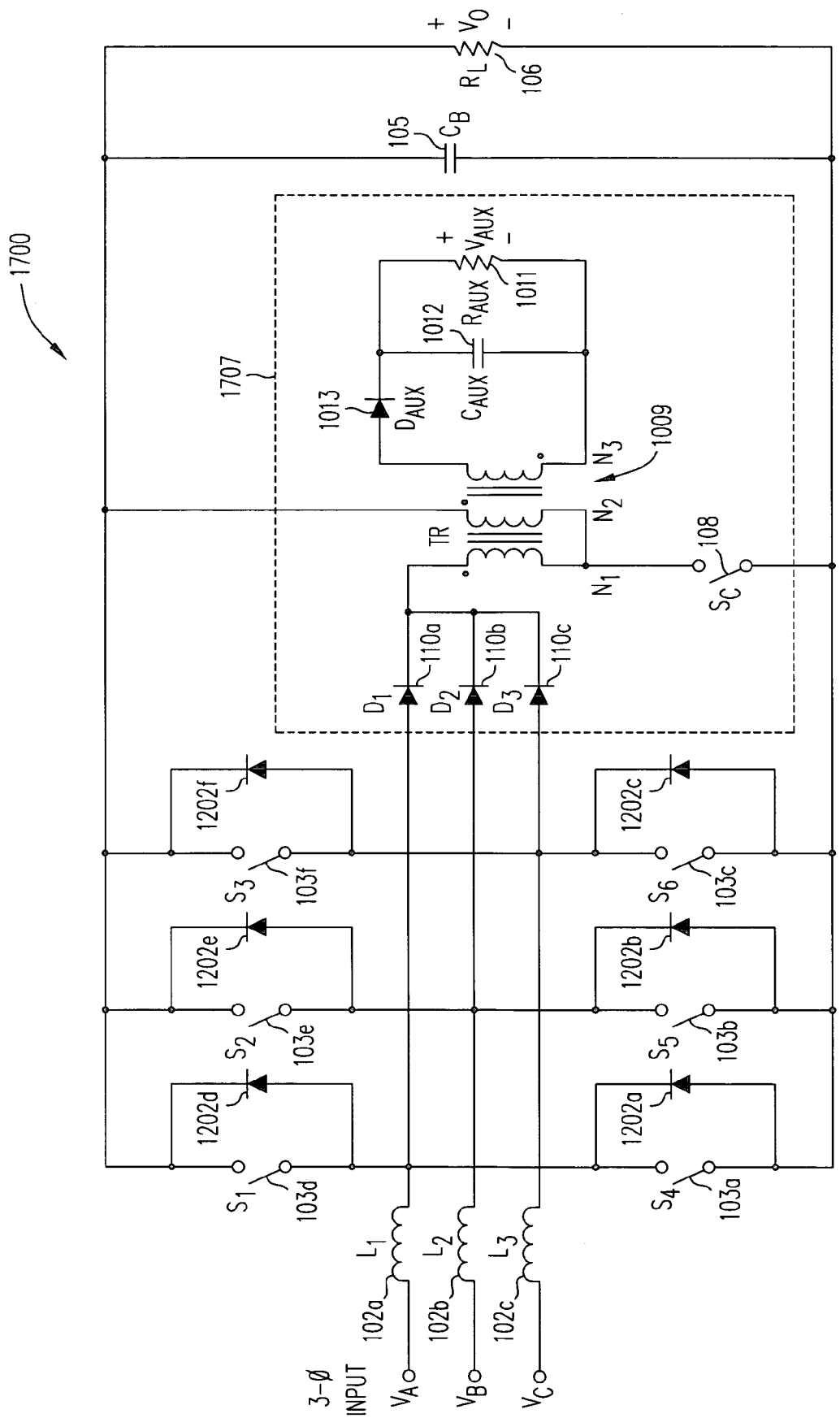
FIG. 17 shows 3-phase AC/DC boost converter 1700 with auxiliary power supply output, in accordance with the present invention.

Three-phase AC/DC boost converters 1500, 1600 and 1700 according to the present invention are shown in FIGS. 15–17. FIG. 15 shows three-phase AC/DC boost converter 1500 with DC-rail rectifier 104. FIGS. 16 and 17 show three-phase AC/DC boost converter 1600 and 1700, without a DC-rail diode and with an integrated auxiliary power output (voltage $V_{AUX}$), respectively. In 3-phase AC/DC boost converters 1600 and 1700, diodes 110a, 110b and 10c connect with the primary side of an active snubber transformer (i.e., transformer 109 or 1009) to achieve ZVS and to minimize reverse-recovery charges of three pairs of boost switches and boost rectifiers, respectively.

Figure 18:
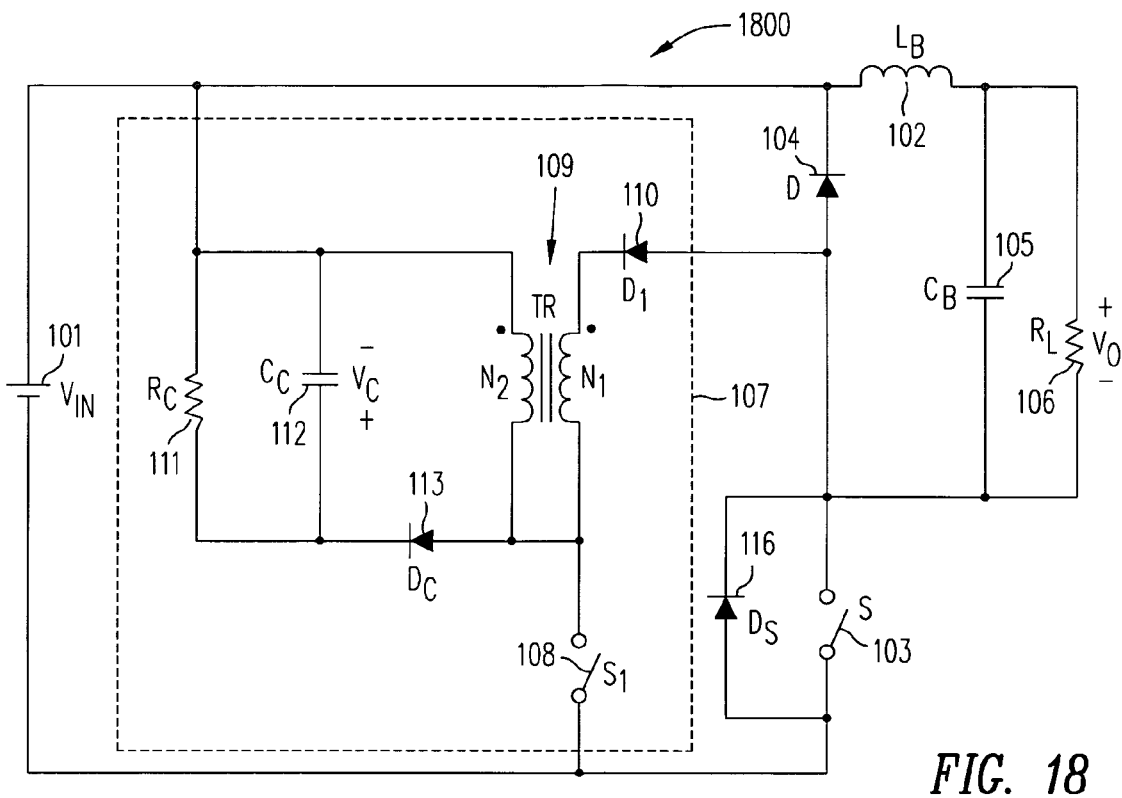
FIG. 18 shows buck converter 1800, including active snubber circuit 1807, in accordance with one embodiment of the present invention.
Figure 19:
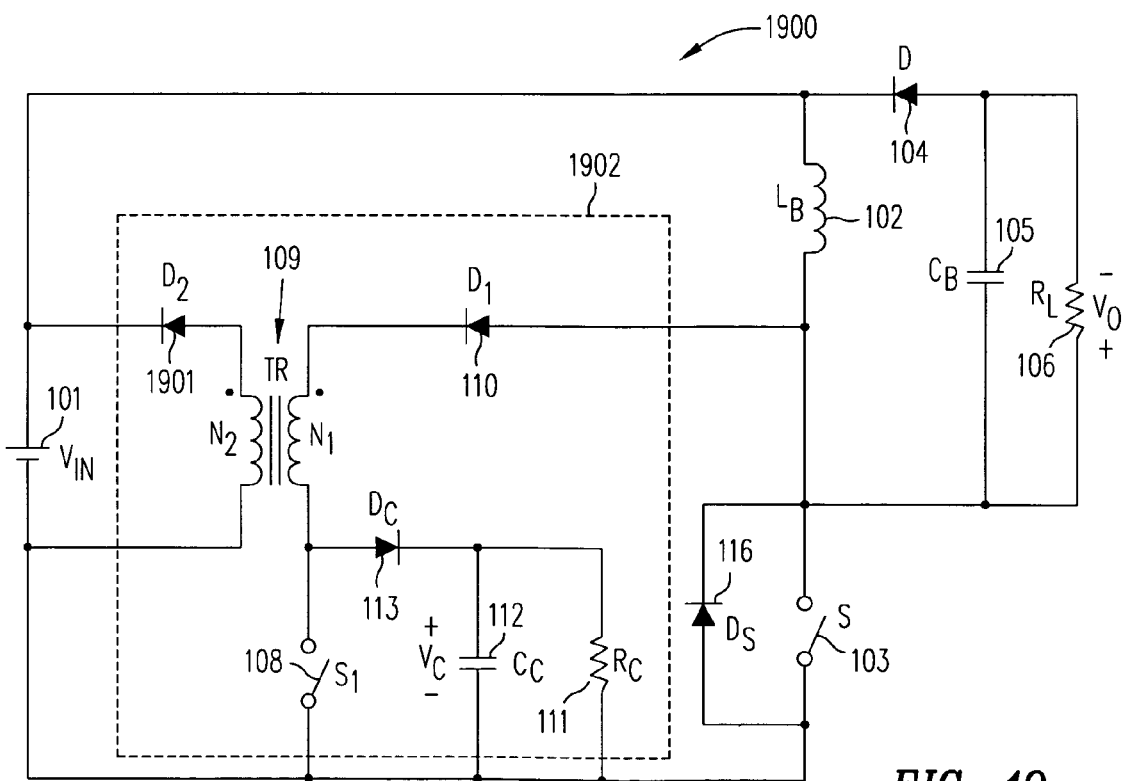
FIG. 19 shows buck/boost converter 1900, including active snubber circuit 1907, in accordance with one embodiment of the present invention.
Figure 20:
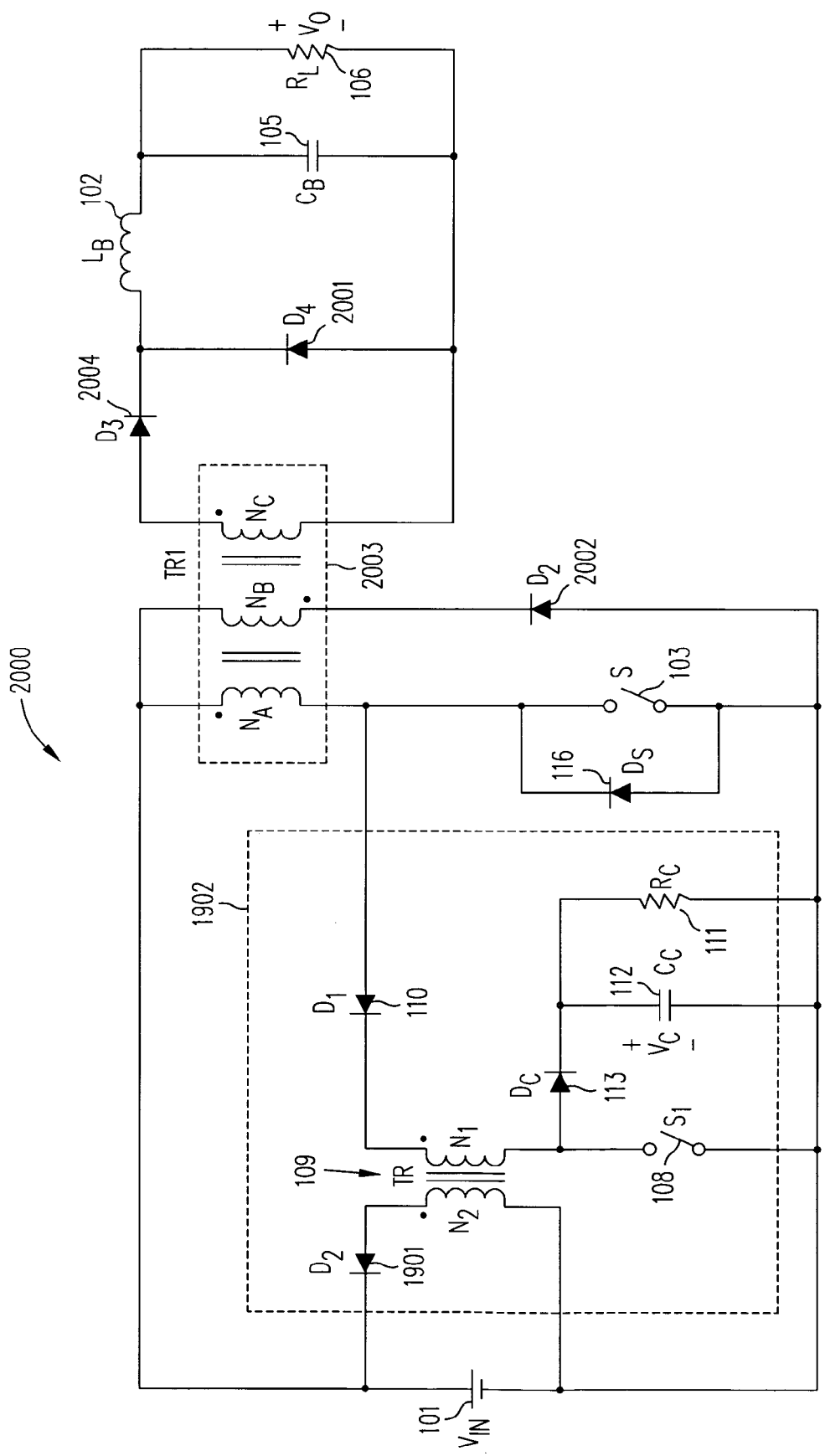
FIG. 20 shows forward converter 2000, including active snubber circuit 2007, in accordance with one embodiment of the present invention.
Figure 21:
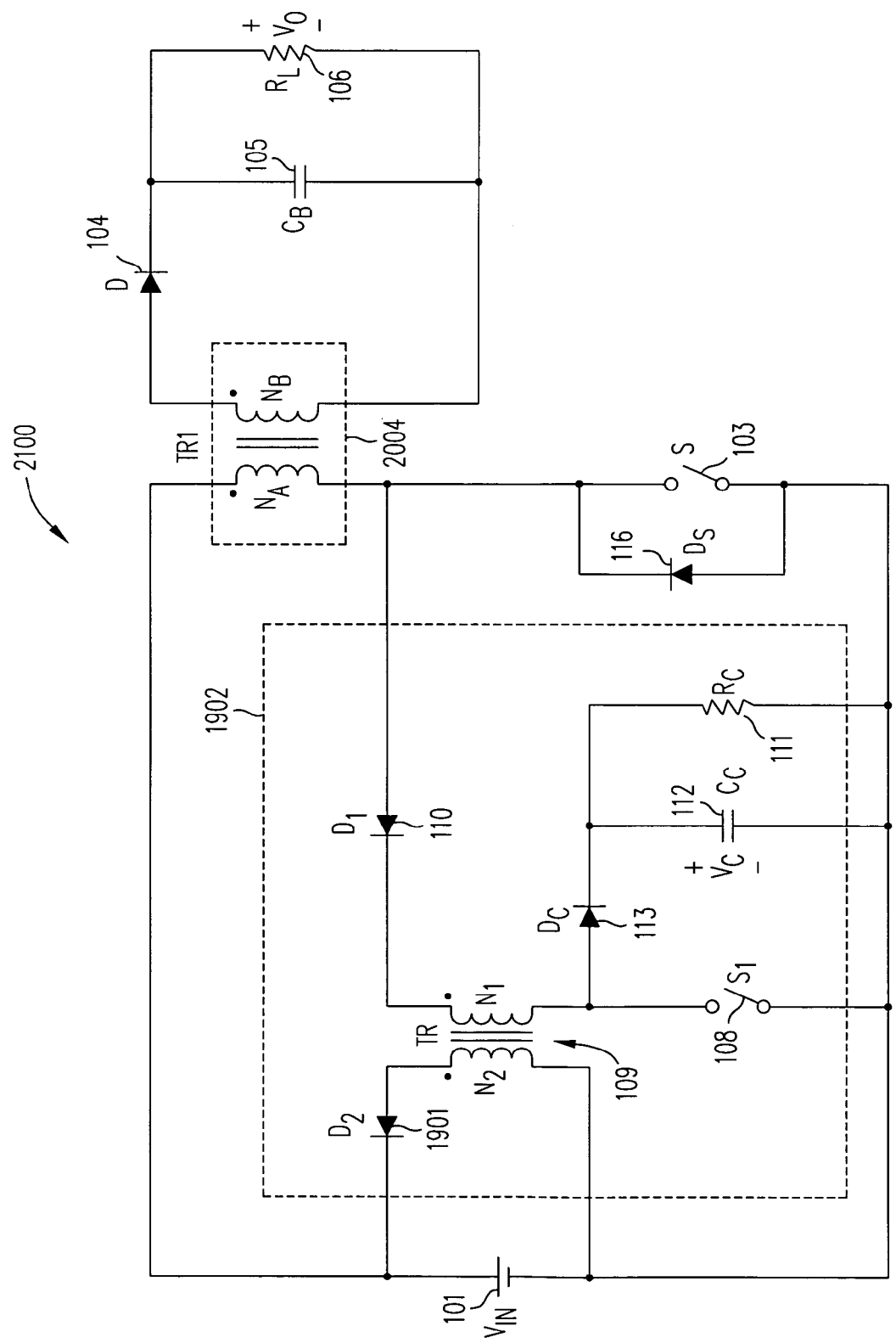
FIG. 21 flyback converter 2100, including active snubber circuit 2107, in accordance with one embodiment of the present invention.
Figure 22:
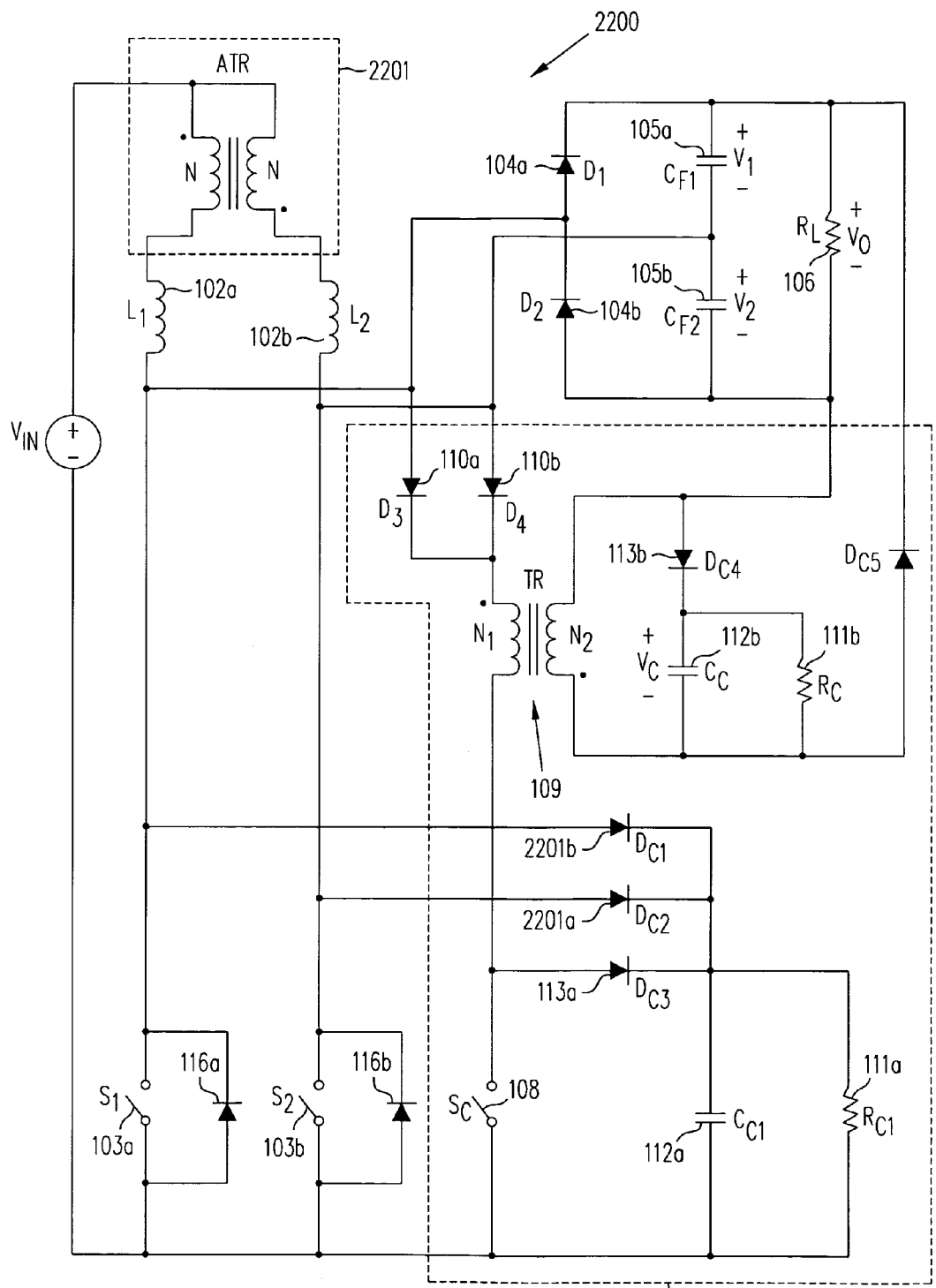
FIG. 22 shows two-inductor boost converter 2200, including active snubber circuit 2207, in accordance with one embodiment of the present invention.

The active snubber of the present invention can be applied to any isolated or non-isolated DC/DC converter, or any single- or three-phase AC/DC converter. For example, FIGS. 18 and 19 show, respectively, buck converters 1800 and buck-boost converter 1900, each having an active snubber. FIGS. 20, 21 and 22 show, respectively, forward converter 2000, flyback converter 2100, and two-inductor boost converter 2200 each having an active snubber, in accordance with the present invention.

Figure 23:
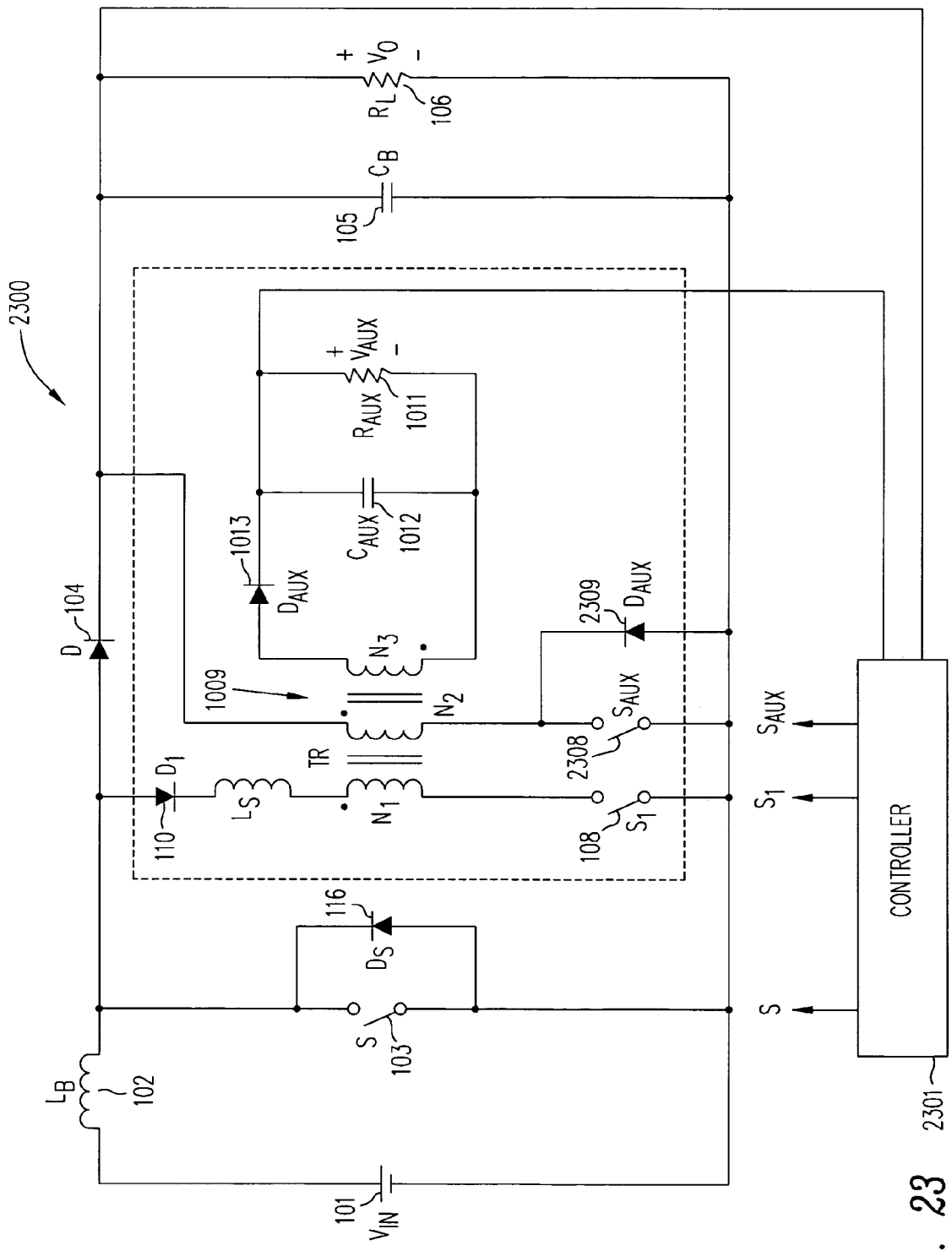
FIG. 23 shows soft-switched boost converter 1000 providing an integrated auxiliary isolated power supply with an auxiliary switch $S_{aux}$. It also shows, conceptually, a two-loop control of circuit 2300, regulating both the output voltage of boost-converter 1000 and voltage $V_{aux}$ in the auxiliary power supply.

FIG. 23 shows soft-switched boost converter 2300, which differs from soft-switched boost converter 1000 of FIG. 10 by providing an integrated auxiliary isolated power supply with auxiliary switch 2308, which is controlled by control signal $S_{AUX}$ provided by two-loop control circuit 2301. Control circuit 2301 provides two independent feedback control loops to regulate both output voltage $V_O$ and voltage $V_{AUX}$ in the auxiliary power supply. In FIG. 23, output voltage $V_O$ is regulated by modulated duty cycle D of boost switch 103, and auxiliary output voltage $V_{AUX}$ is regulated by modulating the duty cycle of auxiliary switch 2308.

The above detailed description is provided to illustrate specific embodiments of the present invention and is not intended to be limiting the scope of the present invention. Numerous variations and modifications of the present invention are possible. The present invention is set forth in the following claims.

We claim:

1. A power converter having an input terminal and an output terminal, the input terminal being coupled to a power source, the power converter comprising:
    a storage inductor coupled to the input terminal;
    a first switch operating to charge and discharge the storage inductor;
    an active snubber including a second switch, coupled to a reference voltage that is substantially constant over a switching cycle of the first and second switches;
    a rectifier operatively coupled to the storage inductor, the active snubber and the output terminal to transfer energy from the storage inductor to the output terminal; and
    a control circuit that provides control signals to control the operations of the first and second switches over the switching cycle, such that the second switch closes to cause a current in the rectifier to be diverted from the rectifier to the active snubber, so as to allow the first switch to close at a substantially zero voltage condition and, in turn, to allow the second switch to open at substantially zero current condition.

2. A power converter as in claim 1, wherein the reference voltage is provided by the voltage at the output terminal.

3. A power converter as in claim 1, wherein the reference voltage is provided by the voltage at the input terminal.

4. A power converter as in claim 1, wherein the reference voltage is provided by a terminal of the storage inductor.

5. A power converter as in claim 1, wherein the reference voltage is provided by a negative rail of the power source.

6. A power converter as in claim 1, wherein the power converter is configured as a boost converter.

7. A power converter as in claim 1, wherein the power converter is configured as a forward converter.

8. A power converter as in claim 1, wherein the power converter is configured as a buck converter.

9. A power converter as in claim 1, wherein the power converter is configured as a buck/boost converter.

10. A power converter as in claim 1, wherein the power converter is configured as a two-inductor boost converter.

11. A power converter as in claim 1, wherein the active snubber comprises a voltage clamp circuit.

12. A power converter as in claim 11, further comprising a snubber inductor coupled between the storage inductor and the voltage clamp circuit.

13. A power converter as in claim 11, wherein the voltage clamp circuit comprises:
    a transformer;
    a diode;
    a capacitor; and
    a resistor.

14. A power converter as in claim 13, wherein the transformer comprises a transformer having a turns ratio between a primary winding and a secondary winding of less than 0.5.

15. A power converter as in claim 13, wherein the transformer has a leakage inductance that determines the rate of change of the current in the rectifier.

16. A power converter as in claim 15, wherein the rate of change of the current in the rectifier is substantially constant.

17. A power converter as in claim 11, wherein the active snubber comprises an isolated power supply.

18. A power converter as in claim 17, wherein the control circuit receives as input an output voltage of the isolated power supply, so as to regulate the output voltage of the isolated power supply independently of the voltage at the output terminal.

19. A power converter as in claim 18, further comprising an auxiliary switch coupled between the transformer winding and the negative rail of the power source.

20. A power converter as in claim 1, wherein the first switch comprises an insulated gate bipolar transistor, and the active snubber is connected across the insulated gate bipolar transistor.

21. A power converter as in claim 20, wherein an anti-parallel diode is provided across the insulated gate bipolar transistor.

22. A power converter as in claim 1, wherein the second switch comprises an insulated gate bipolar transistor.

23. A power converter as in claim 1, wherein the power source comprises an AC power source.

24. A power converter as in claim 23, wherein the first switch and the rectifier are parts of a full-wave rectifier.

25. A power converter as in claim 1, wherein the power source provides a single-phase voltage.

26. A power converter as in claim 1, wherein the power source provides a three-phase voltage.

27. A method for power regulation in a power converter having an input terminal and an output terminal, the input terminal being coupled to a power source, the method comprising:

providing a storage inductor coupled to the input terminal;
   coupling a first switch to charge and discharge the storage inductor;
   providing an active snubber including a second switch, the active snubber being coupled to a reference voltage that is substantially constant over a switching cycle of the first and second switches;
   coupling a rectifier to the storage inductor, the active snubber and the output terminal, so as to transfer energy from the storage inductor to the output terminal; and
   controlling the operations of the first and second switches over the switching cycle, such that the second switch closes to cause a current in the rectifier to be diverted from the rectifier to the active snubber, so as to allow the first switch to close at a substantially zero voltage condition and, in turn, to allow the second switch to open at substantially zero current condition.

28. A method as in claim 27, further comprising providing as the reference voltage the voltage at the output terminal.

29. A method as in claim 27, further comprising providing as the reference voltage the voltage at the input terminal.

30. A method as in claim 27, further comprising providing as the reference voltage the voltage of a terminal of the storage inductor.

31. A method as in claim 27, further comprising providing as the reference voltage the voltage at a negative rail of the power source.

32. A method as in claim 27, further comprising configuring the power converter as a boost converter.

33. A method as in claim 27, further comprising configuring the power converter as a forward converter.

34. A method as in claim 27, further comprising configuring the power converter as a buck converter.

35. A method as in claim 27, further comprising configuring the power converter as a buck/boost converter.

36. A method as in claim 27, further comprising configuring the power converter as a two-inductor boost converter.

37. A method as in claim 27, further comprising providing in the active snubber a voltage clamp circuit.

38. A method as in claim 36, further comprising a snubber inductor coupled between the storage inductor and the voltage clamp circuit.

39. A method as in claim 36, further comprising providing in the voltage clamp circuit a transformer, a diode, a capacitor and a resistor.

40. A method as in claim 39, wherein the transformer is provided a turns ratio between a primary winding and a secondary winding of less than 0.5.

41. A method as in claim 39, wherein the transformer has a leakage inductance that determines the rate of change of the current in the rectifier.

42. A method as in claim 41, wherein the rate of change of the current in the rectifier is substantially constant.

43. A method as in claim 36, further comprising providing in the active snubber an isolated power supply.

44. A method as in claim 43, wherein the controlling includes receiving as input an output voltage of the isolated power supply, so as to regulate the output voltage of the isolated power supply independently of the voltage at the output terminal.

45. A method as in claim 44, further comprising an auxiliary switch coupled between the transformer winding and the negative rail of the power source.

46. A method as in claim 27, wherein the first switch is provided by an insulated gate bipolar transistor, and the active snubber is connected across the insulated gate bipolar transistor.

47. A method as in claim 46, wherein an antiparallel diode is provided across the insulated gate bipolar transistor.

48. A method as in claim 27, wherein the second switch comprises an insulated gate bipolar transistor.

49. A method as in claim 27, wherein the power source comprises an AC power source.

50. A method as in claim 49, wherein the first switch and the rectifier are provided in a full-wave rectifier.

51. A method as in claim 49, wherein the power source provides a single-phase voltage.

52. A method as in claim 49, wherein the power source provides a three-phase voltage.

* * * * *